United States Patent
Asahara et al.

(10) Patent No.: US 11,304,176 B2
(45) Date of Patent: Apr. 12, 2022

(54) DEVICE CONTROL SYSTEM AND METHOD THEREOF

(71) Applicant: HITACHI INFORMATION & TELECOMMUNICATION ENGINEERING, LTD., Kanagawa (JP)

(72) Inventors: Akinori Asahara, Tokyo (JP); Nobuo Sato, Tokyo (JP)

(73) Assignee: HITACHI INFORMATION & TELECOMMUNICATION ENGINEERING, LTD., Kanagawa (JP)

( * ) Notice: Subject to any disclaimer, the term of this patent is extended or adjusted under 35 U.S.C. 154(b) by 0 days.

(21) Appl. No.: 16/979,408

(22) PCT Filed: Feb. 18, 2019

(86) PCT No.: PCT/JP2019/005894
§ 371 (c)(1),
(2) Date: Sep. 9, 2020

(87) PCT Pub. No.: WO2019/193850
PCT Pub. Date: Oct. 10, 2019

(65) Prior Publication Data
US 2021/0084612 A1    Mar. 18, 2021

(30) Foreign Application Priority Data
Apr. 5, 2018  (JP) .............................. JP2018-072961

(51) Int. Cl.
*H04W 64/00* (2009.01)
*G06F 16/29* (2019.01)
*H04W 40/22* (2009.01)

(52) U.S. Cl.
CPC .......... *H04W 64/006* (2013.01); *G06F 16/29* (2019.01); *H04W 40/22* (2013.01); *H04W 64/003* (2013.01)

(58) Field of Classification Search
CPC .......... G06N 20/00; G06N 3/006; G06N 3/02; G06N 3/0445; G06N 3/0454; G06N 3/08;
(Continued)

(56) References Cited

U.S. PATENT DOCUMENTS

2007/0271006 A1* 11/2007 Golden ............. H02J 13/00002
700/295
2011/0093126 A1    4/2011 Minako et al.
(Continued)

FOREIGN PATENT DOCUMENTS

CN    104076758 A    10/2014
JP    2000-224670 A    8/2000
(Continued)

OTHER PUBLICATIONS

Chinese Office Action dated Jun. 29, 2021 for Chinese Patent Application No. 201980003829.8.

*Primary Examiner* — Kwasi Karikari
(74) *Attorney, Agent, or Firm* — Volpe Koenig

(57) ABSTRACT

A device control system includes a control request issuing unit for issuing a control request defining a position of a moving object and the device control according to operation of a user; a determination plan generation unit configured to, based on the control request, generating a condition; a determination unit for determining whether a condition of the control request related to the moving object is satisfied and issuing an identifier of the control request; at least one condition determination generated by the determination plan generation unit; an execution plan generation unit for generating a control execution unit configured to receive the identifier of the control request, identifying a device that is
(Continued)

a control target according to a control rule defined in the control request, and transferring a control command according to a control procedure, and one or a plurality of control execution units generated by the execution plan generation unit.

13 Claims, 25 Drawing Sheets

(58) Field of Classification Search
CPC ....... G06N 5/025; H04L 67/12; H04L 1/0041; H04L 41/147; H04L 41/16; H04L 43/08; H04L 43/50; H04W 4/38; H04W 16/22; H04W 64/006; H04W 84/18
See application file for complete search history.

(56) References Cited

U.S. PATENT DOCUMENTS

| | | |
|---|---|---|
| 2012/0065800 A1* | 3/2012 | Baba .................. H02J 13/0017 700/295 |
| 2014/0095663 A1 | 4/2014 | Koji |
| 2014/0285013 A1 | 9/2014 | Noguchi et al. |

FOREIGN PATENT DOCUMENTS

| | | |
|---|---|---|
| JP | 2011-089682 A | 5/2011 |
| JP | 2013-236520 A | 11/2013 |
| JP | 2017-040530 A | 2/2017 |
| JP | 2017-076430 A | 4/2017 |

\* cited by examiner

| ITEM NAME | CONTENT |
|---|---|
| COMMUNICATION ADDRESS 701 | COMMUNICATION ADDRESS OF REGISTRANT |
| RECEIVED TOPIC ID 702 | IDENTIFIER UNIQUELY IDENTIFYING TOPIC OF REGISTRATION TARGET |
| RECEIVED SUBTOPIC ID 703 | IDENTIFIER UNIQUELY IDENTIFYING SUBTOPIC OF REGISTRATION TARGET. MEANS THAT ALL MESSAGES WILL BE RECEIVED REGARDLESS OF SUBTOPIC WHEN WILDCARD IS SPECIFIED. |

| ITEM NAME | CONTENT |
|---|---|
| TOPIC ID 802 | IDENTIFIER THAT UNIQUELY IDENTIFIES TOPIC |
| SUBTOPIC ID 803 | IDENTIFIER UNIQUELY IDENTIFYING SUBTOPIC OF REGISTRATION TARGET |
| DESTINATION ADDRESS LIST 804 | COMMUNICATION ADDRESS LIST OF REGISTRANTS OF TOPIC ID 802 AND SUBTOPIC ID 803 |

FIG. 11

| LARGE ITEM NAME | SMALL ITEM NAME | CONTENT |
|---|---|---|
| TOPIC INFORMATION 1102 | TOPIC ID 1105 | PREDETERMINED CODE SHOWING IT IS CONTROL REQUEST |
| | SUBTOPIC ID 1106 | REQUEST ID SEQUENTIALLY NUMBERED EVERY TIME CONTROL REQUEST ISSUING IS PERFORMED |
| CONDITION DESCRIPTION 1103 | DETERMINATION CONDITION 1107 | DETERMINATION CONDITION SPECIFIED BY USER |
| | DATA SELECTION CONDITION 1108 | DETERMINATION RANGE SPECIFIED BY USER |
| RESULT DESCRIPTION 1104 | TARGET AREA 1109 | AREA ID SPECIFIED BY USER |
| | STATE CHANGE TYPE 1110 | USER SPECIFIES STATE CHANGE OR INTERRUPT |
| | STATE CHANGE CONTENT 1111 | STATE CHANGE CONTENT FOR EACH DEVICE TYPE SPECIFIED BY USER |

FIG. 12A

DATA STRUCTURE OF AREA INFORMATION DATA 1201

| ITEM NUMBER | ITEM NAME | CONTENT |
|---|---|---|
| 1 | AREA ID 1202 | IDENTIFIER THAT IDENTIFIES AREA |
| 2 | AREA TYPE 1203 | CODE SHOWING TYPE OF AREA |
| 3 | AREA SHAPE 1204 | COORDINATE VALUE SEQUENCE REPRESENTING AREA SHAPE |

FIG. 12B

DATA STRUCTURE OF DEVICE ARRANGEMENT DATA 1205

| ITEM NUMBER | ITEM NAME | CONTENT |
|---|---|---|
| 1 | DEVICE ID 1206 | IDENTIFIER OF DEVICE |
| 2 | DEVICE POSITION 1207 | COORDINATE OF DEVICE |
| 3 | DEVICE INFLUENCE RANGE 1208 | COORDINATE VALUE SEQUENCE SHOWING RANGE INFLUENCED BY DEVICE |
| 4 | DEVICE TYPE 1209 | CODE SHOWING TYPE (LIGHTING, SOUND, AND THE LIKE) OF DEVICE |
| 5 | DEVICE MODEL NUMBER 1210 | MODEL NUMBER OF DEVICE |
| 6 | DEVICE ADDRESS 1211 | NETWORK ADDRESS OF DEVICE |

FIG. 15

| ITEM NAME | CONTENT |
|---|---|
| REQUEST ID 1502 | SUBTOPIC ID 1106 OF CONTROL REQUEST DATA 1101 |
| DETERMINATION CONDITION 1503 | DETERMINATION CONDITION 1107 OF CONTROL REQUEST DATA 1101 |
| DATA SELECTION CONDITION 1504 | DATA SELECTION CONDITION 1108 OF CONTROL REQUEST DATA 1101 |

DATA STRUCTURE OF EXECUTION CONTROL COMMAND 1701

| ITEM NAME | CONTENT |
|---|---|
| CONTROL COMMAND SEQUENCE 1702 | COMMAND SEQUENCE ACCORDING TO MODEL NUMBER OF DEVICE, CORRESPONDING TO STATE CHANGE TYPE 1110 AND STATE CHANGE CONTENT 1111 |
| TRANSMISSION TARGET 1703 | DEVICE ADDRESS 1211 OF DEVICE IN TARGET AREA 1109 |

FIG. 20
DATA STRUCTURE OF POSITION DATA 2001

| ITEM NAME | CONTENT |
|---|---|
| TOPIC ID 2002 | PREDETERMINED VALUE SHOWING IT IS POSITION UPDATE |
| PERSON ID [1] 2003 | IDENTIFIER OF FIRST MEASURED PERSON |
| MEASUREMENT TIME [1] 2004 | TIME WHEN FIRST MEASUREMENT IS PERFORMED |
| COORDINATE [1] 2005 | POSITION OF FIRST MEASURED PERSON |
| : | : |
| : | : |
| PERSON ID [n] | IDENTIFIER OF n-TH MEASURED PERSON |
| MEASUREMENT TIME [n] | TIME WHEN n-TH MEASUREMENT IS PERFORMED |
| COORDINATE [n] | POSITION OF n-TH MEASURED PERSON |

FIG. 22

DATA STRUCTURE OF PAST POSITION DATA 2200

| ITEM NAME | CONTENT |
|---|---|
| REQUEST ID 2201 | STORE REQUEST ID 1502 OF DETERMINATION RULE 1501 |
| PERSON ID 2202 | IDENTIFIER OF MEASURED PERSON CORRESPONDING TO 2003 |
| MEASUREMENT TIME 2203 | TIME WHEN MEASUREMENT IS PERFORMED, CORRESPONDING TO 2004 |
| COORDINATES 2204 | POSITION OF MEASURED PERSON CORRESPONDING TO 2005 |

FIG. 23

DATA STRUCTURE OF POSITION DETERMINATION RESULT DATA 2301

| ITEM NAME | CONTENT |
|---|---|
| TOPIC ID 2302 | PREDETERMINED VALUE SHOWING IT IS POSITION DETERMINATION RESULT DATA 2301 |
| SUBTOPIC ID 2303 | STORE REQUEST ID 1502 OF DETERMINATION RULE 1501 |
| DETERMINATION RESULT 2304 | VALUE ("TRUE") ALWAYS MEANING TRUE IS STORED |

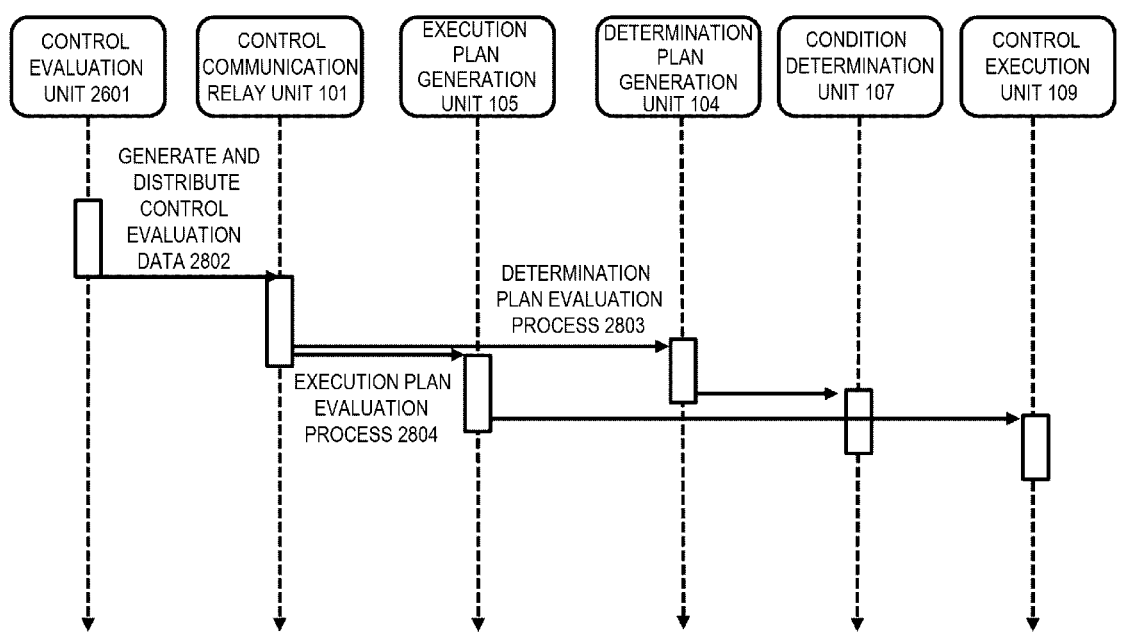

DEVICE CONTROL SYSTEM AND METHOD THEREOF

TECHNICAL FIELD

The present invention relates to a device control system and a method thereof, and more particularly to a device control system and a method thereof for controlling a device using detection information of a moving object.

BACKGROUND ART

A technique of detecting a moving object such as a person by a sensor and controlling various devices using detection information (sensor information) thereof has been put into practical use. For example, PTL 1 discloses an electric power management support device that controls an electric power consumption device based on a control rule and uses sensing information indicating a position of a person on a floor to reduce electric power consumption in a control simulation of electric devices on the floor of a building.

Further, PTL 2 discloses, in a moving body measurement system that accurately determines a trajectory of the same moving object based on measurement results of sensors having different accuracy, a technique of detecting a person using a device that scans surroundings with a device using an infrared laser light and measures positions of objects in the surroundings, and a technique of detecting a person by extracting face areas from camera images.

CITATION LIST

Patent Literature

PTL 1: JP-A-2013-236520
PTL 2: JP-A-2017-040530

SUMMARY OF INVENTION

Technical Problem

According to the technique disclosed in PTL 1, it is possible to maintain an environment with high comfort for the person, such as automatically operating an air conditioner when people are crowded. However, it is assumed that a malfunction occurs when the accuracy is low, such as when people are crowded. In the technique disclosed in PTL 2, since the position of the person can be estimated by using results of the measurement by the laser and the measurement by the camera at the same time, the position of the person can be measured more accurately. By using this, the malfunction can be reduced.

However, even if actual operations of the device are accurate, it may be different from operations expected by a user. For example, there is a situation in which when a new vending machine is provided in a corner of an office building and more people are staying near the vending machine than before, a person there will be detected and the air conditioner will operate unnecessarily. As in this example, a status assumed at a time of design is frequently changed thereafter, and it is considered that it is not appropriate to perform the control in accordance with a rule before that.

In this case, it is conceivable to change the control rule, but in order to change the control rule incorporated in the device, it is necessary for a person having knowledge related to the device to change setting of the device. In addition, when an operation of the sensor that detects the person and the control of a large number of devices are linked, the control rule becomes extremely complicated, and it takes a lot of time to change the setting.

Further, there is ambiguity in the setting related to the position of the person. For example, validity of the setting, such as whether a person staying within 2 m around the vending machine should be a target, whether a person staying within 2.3 m should be the target, or whether a person staying within 1.8 m should be the target, is difficult to judge on the desk and there are many things we do not know until the actually operate the device. Therefore, in most cases, it is usually necessary to operate the device with a temporary setting, and when there is a problem thereafter, perform the setting again.

As described above, changing a complicated control rule is difficult in terms of cost and time required for implementation work. Only under such status, it is possible to simply stop the device control, but in an application where such a status frequently appears, it is considered difficult to link human detection and control with the complicated rule because of inconvenience of the setting. Incidentally, the above PTL 1 and PTL 2 do not specifically mention how to change the control rule for device control after a start of operation of the system.

An object of the invention is to facilitate a setting change related to device control even during an operation of a system.

Solution to Problem

A preferred aspect of a device control system according to the invention is configured as
a device control system that performs device control, the device control system including:
a control request issuing unit configured to issue a control request that defines a position of a moving object and the device control according to an operation of a user;
a determination plan generation unit configured to, based on the control request issued by the control request issuing unit, generate a condition determination unit configured to determine whether a condition of the control request related to the moving object is satisfied and issue an identifier of the control request;
one or a plurality of condition determination units generated by the determination plan generation unit;
an execution plan generation unit configured to generate a control execution unit configured to receive the identifier of the control request, identify a device that is a control target according to a control rule defined in the control request, and transfer a control command according to a control procedure for the device to the device; and
one or a plurality of control execution units generated by the execution plan generation unit.
The invention is also configured as a device control method in the device control system.

Advantageous Effect

According to the invention, a setting change related to the device control can be easily performed even during an operation of the system.

BRIEF DESCRIPTION OF DRAWINGS

FIG. 11 is a diagram showing a data structure of control request data 11.

FIGS. 12A and 12B show diagrams showing data structures of a layout DB 106.

FIG. 15 is a diagram showing an example of a structure of a determination rule 1501.

FIG. 20 is a diagram showing a data structure of position data 2001 of a person.

FIG. 22 is a diagram showing data items of past position data 2201.

FIG. 23 is a diagram showing a data structure of position determination result data 2301.

FIG. 28 is a diagram showing an example of a control evaluation sequence.

FIG. 29 is a diagram showing an example of a data structure of control evaluation data.

DESCRIPTION OF EMBODIMENTS

Hereinafter, embodiments of the invention will be described with reference to the drawings.

First Embodiment

Figure 1:
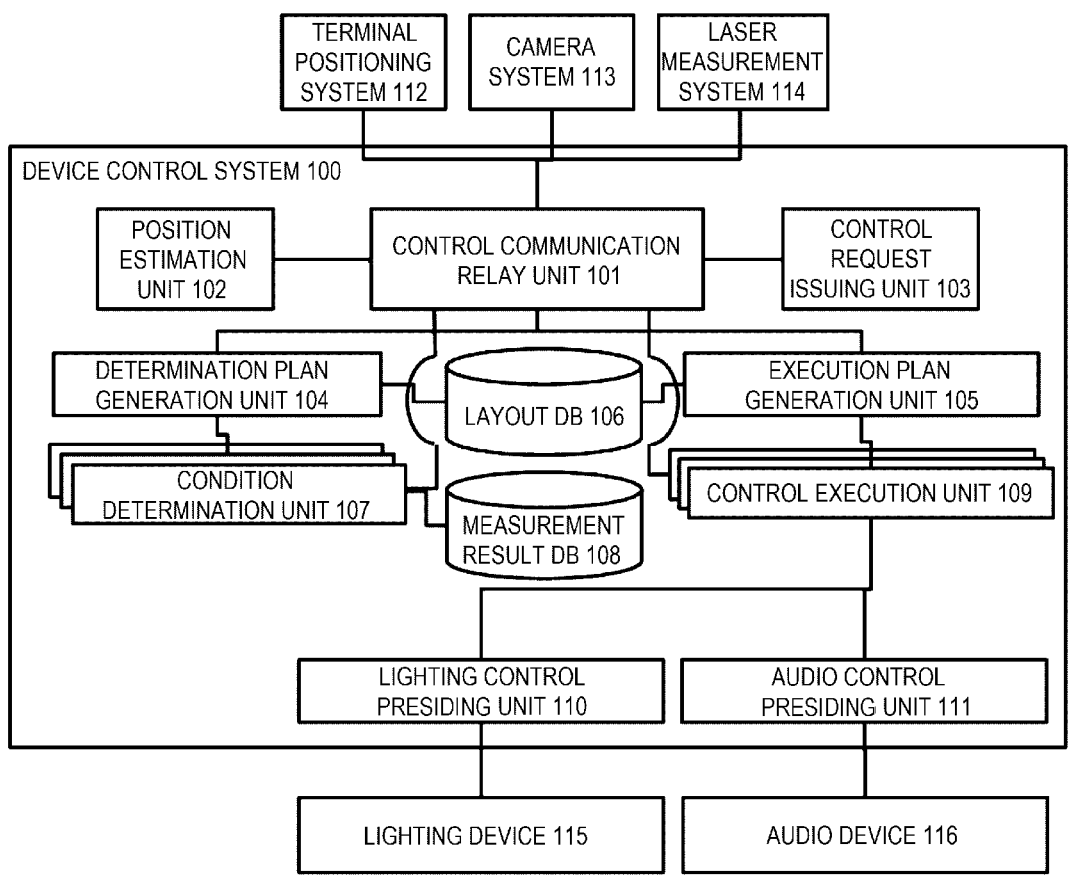
FIG. 1 is a diagram showing a configuration of a device control system according to a first embodiment.
Figure 2A:
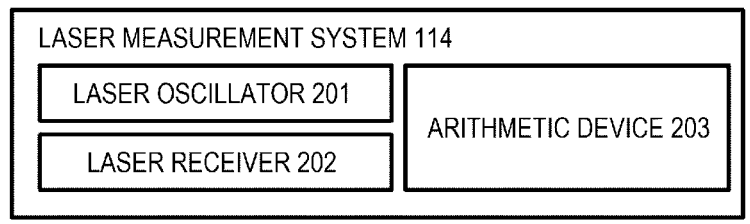
FIGS. 2A-2D show diagrams showing hardware configurations of devices that constitute the device control system.
Figure 2B:
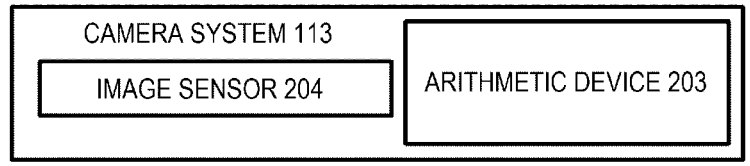
Figure 2C:
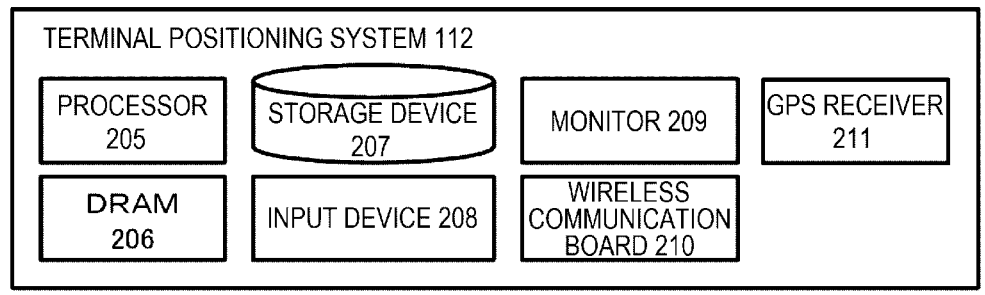
Figure 2D:
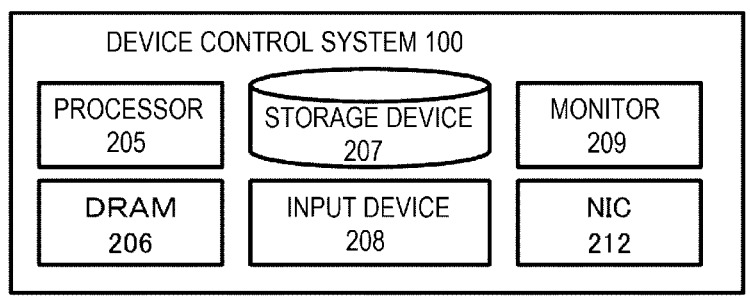

FIG. 1 shows a configuration of a device control system according to a first embodiment.

A device control system 100 is connected to a sensor system such as a terminal positioning system 112, a camera system 113, a laser measurement system 114, and a lighting device 115 and an audio device 116 that are control targets, and is described as a system for controlling the lighting device 115 and the audio device 116 using detection information obtained from the sensor system. In the present embodiment, it is assumed that a sensor system applied to, for example, an office or a building detects presence of a moving object such as a person and uses sensor information thereof to control the lighting device and the like in the office.

The terminal positioning system 112, the camera system 113, and the laser measurement system 114 detect the presence of a person by processing wireless communication, an image of a visible light, and a signal of a reflected light of an infrared laser by a known method. Other sensors that detect the person are possible, but any sensor that can measure the person and a position thereof can be used. (Hereinafter, these systems 112, 113, and 114 may be collectively referred to as a sensor.)

The lighting device 115 is a device as the control target that changes brightness and a color of lighting and the audio device 116 is a device as the control target that outputs a sound. In addition to the lighting device and the audio device, any device, such as air-conditioning devices, autonomously moving vehicles, liquid crystal displays, projectors, that needs to be controlled in conjunction with the position of the person can be the control target.

The device control system 100 includes a control communication relay unit 101 that relays various communications including a control request related to device control, a position estimation unit 102 that estimates the position of the person by integrating data from the sensor that detects the person, a control request issuing unit 103 that receives an operation of a user (for example, a system administrator) and issues the control request when a control content is set and changed, a determination plan generation unit 104 that formulates a plan for condition determination of a state change of the device, an execution plan generation unit 105 that formulates an actual control content, a layout database (referred to as DB) 106 that stores information of a position related to walls and pillars in a predetermined area such as offices and facilities, and a stationary object such as a desk and a machine provided therein, a condition determination unit 107 that is generated according to an instruction of the determination plan generation unit 104 and that actually determines a condition, a measurement result DB 108 in which information for the condition determination by the condition determination unit 107 is stored, a control execution unit 109 that is generated according to an instruction of the execution plan generation unit 105 and that actually issues a control command, a lighting control presiding unit 110 that transfers the control command to lighting device 115, and an audio control presiding unit 111 that transfers the control command to the audio device 116. When there is a device that is the control target in addition to the lighting device and the audio device, a control presiding unit corresponding to the device can be added. In the present example, the control communication relay unit 101 uses communication based on a publisher-subscriber architecture, for example, an MQTT protocol, for simplification of implementation, but an appropriate communication relay method can be used according to an implementation environment.

FIGS. 2A-2D show hardware configurations of devices that constitute the device control system.

The laser measurement system 114 includes a laser oscillator 201 that emits a laser light, a laser receiver 202 that reads a reflected light of the laser, and an arithmetic device (CPU) 203 that calculates distances to objects around the laser sensor 101 based on a time taken for laser oscillation and light reception and converts the distances into point cloud data.

The camera system 113 is a system including a general camera, and is a device capable of obtaining the visible light as an image by an image sensor 204 and detecting the person from the image by the arithmetic device (CPU) 203 to estimate the position thereof.

The terminal positioning system 112 includes a processor 205 that performs an arithmetic process, a DRAM 206 that is a volatile temporary storage area capable of being read and written at a high speed, a storage device 207 that is a permanent storage unit such as an HDD or a flash memory, an input device 208 that receives an operation of the person, a monitor 209 for presenting a current status of a terminal, a wireless communication board 210 that is a network interface card for performing the wireless communication, a GPS receiver 211 for identifying a position of the terminal. When the processor 205 executes a program stored in the storage device 207, an own position is estimated using the GPS receiver 211 and is distributed via the wireless communication board 210.

The device control system 100 includes the processor 205 having computational performance, the DRAM 206 that is a volatile temporary storage area capable of being read and written at a high speed, the storage device 207 that is a permanent storage area using an HDD, a flash memory, and the like, the input device 208 that receives the operation of the person, the monitor 209 for presenting information, and a network interface card (NIC) 212 for performing the communication. By executing the program stored in the storage area 209, the processor 205 can implement each function of the control communication relay unit 101, the position estimation unit 102, the control request issuing unit 103, the determination plan generation unit 104, the execution plan generation unit 105, the condition determination unit 107, the control execution unit 109, the lighting control presiding unit 110, and the audio control presiding unit 111 of FIG. 1. The input device 208 and the monitor 209 implement the control request issuing unit 103. The layout DB 106 and the measurement result DB 108 are stored and formed in the storage device 207.

One of characteristics of the present embodiment is that in response to a request from the control request issuing unit 103 operated by a user 301, the determination plan generation unit 104 and the execution plan generation unit 105 respectively generate the condition determination unit 107 and the control execution unit 109 for changing the device control, and the generated condition determination unit 107 and the generated control execution unit 109 operate independently from the other condition determination unit 107 and control execution unit 109 to control the device. Accordingly, even after the operation of the device control system is started (that is, during the operation), it is possible to freely and easily change, for example, add or delete a position and a control rule, and it is possible to timely respond to a status change of a site where the device is provided.

Figure 3:
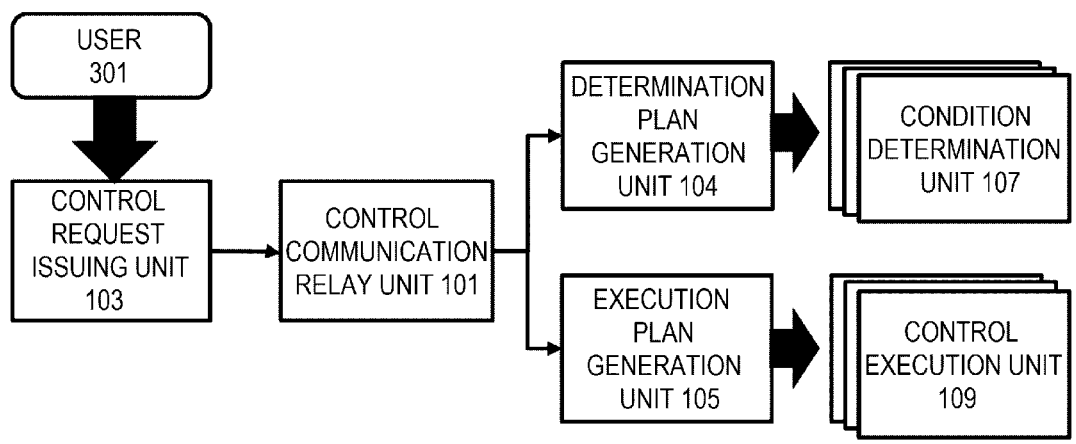
FIG. 3 is a diagram schematically showing a flow of control condition setting.
Figure 4:
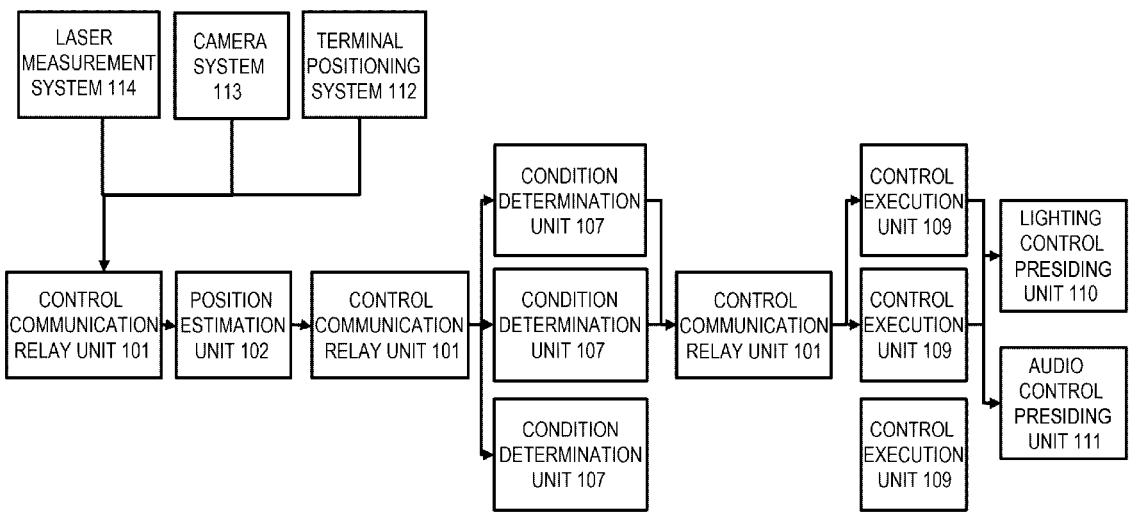
FIG. 4 is a diagram schematically showing a flow of device control.

Next, with reference to FIGS. 3 and 4, setting of change of the position and the control rule, and the device control will be described. FIG. 3 shows a flow of control condition setting for adding the control request to the device control system. FIG. 4 shows a flow when executing the device control for actual control.

When the user 301 wants to change the control content, the user 301 can use the control request issuing unit 103 to specify and input "when the position is in what status" and "what happens to the device". The control request issuing unit 103 transfers the input control request as a message to the determination plan generation unit 104 and the execution plan generation unit 105 via the control communication relay unit 101. The determination plan generation unit 104 and the execution plan generation unit 105 interpret this request to generate a specific operation code, and generate the condition determination unit 107 and the control execution unit 109 that execute the specific operation code and cause them to operate.

In the device control system, the control rule according to a request of the user 301 can be changed even after the operation is started. The control condition setting can be executed many times according to the request of the user 301. The condition determination unit 107 and the control execution unit 109 operate independently of each other using a thread process such that a plurality of the condition determination units 107 and control execution units 109 may be generated. The process can be executed at a higher speed by being distributed and executed in a plurality of computers instead of threads.

FIG. 4 shows the flow when the condition determination unit 107 and the control execution unit 109 generated by the control condition setting actually execute the device control.

In the device control, when pieces of information related to the position detection transmitted by the terminal positioning system 112, the camera system 113, and the laser measurement system 114 is received by the position estimation unit 102 via the control communication relay unit 101, the position estimation unit 102 combines the pieces of information to estimate the position of the person. A result thereof is distributed to the condition determination units 107 generated by the control condition setting via the control communication relay unit 101.

The plurality of the condition determination units 107 are generated when the control condition setting is executed a plurality of times. Information of the condition determination unit 107 that has determined that a condition for changing the device control is satisfied is notified to the corresponding control execution unit 109 via the control communication relay unit 101. The control execution unit 109 transfers the control command generated in advance to the lighting control presiding unit 110 and the audio control presiding unit 111, and causes the lighting device 115 and the audio device 116 to operate appropriately. It should be noted that in the present embodiment, the communication of each unit is performed via the control cooperation relay unit 101, but this is for the simplification of implementation, and each unit may directly communicate with each other for a purpose of reducing the number of times of communication.

Next, with reference to FIG. 5 and subsequent drawings, process details of the control condition setting (FIG. 3) and the device control (FIG. 4) will be described. FIGS. 5 to 17 will be referred to for the description of the control condition setting, and FIGS. 18 to 24 will be referred to for the description of the device control.

Next, a process of the control condition setting will be described.

Figure 5:
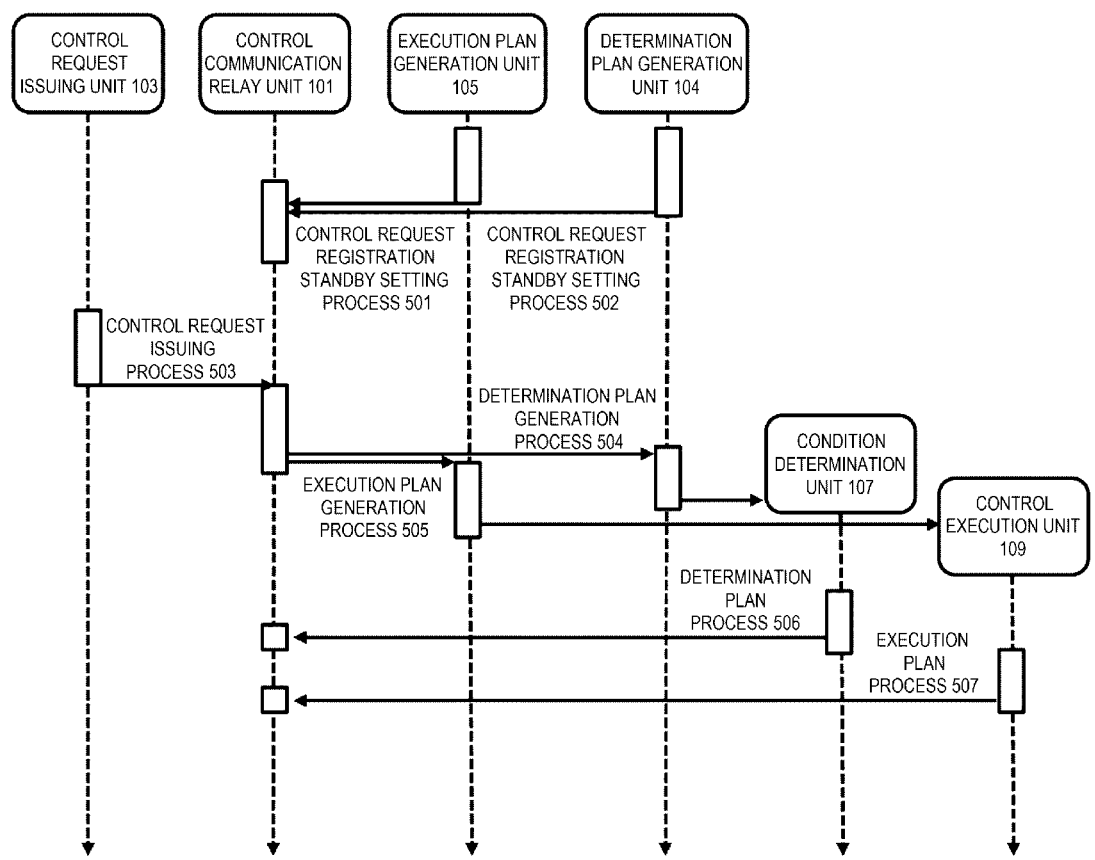
FIG. 5 is a diagram showing a sequence of control condition setting of a determination plan generation unit 104.

FIG. 5 shows a sequence of the control condition setting. In the control condition setting, for example, at a start of operation such as power-on, the determination plan generation unit 104 performs a control request registration standby setting process 501, and the execution plan generation unit 105 performs a control request registration standby setting process 502.

Herein, with reference to FIGS. 6 to 9, details of the control request registration standby setting processes 501 and 502 and a data structure of messages and the like used in these processes will be described.

Figures 6, 7:
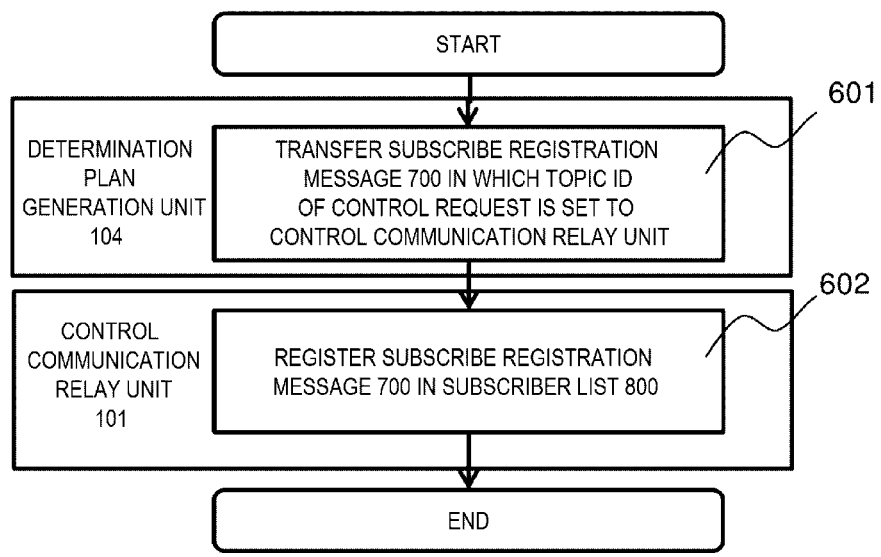
FIG. 6 is a diagram showing a flow of a control request registration standby process 501 of the determination plan generation unit 104.
FIG. 7 is a diagram showing a data structure of a subscribe registration message 700.

FIG. 6 shows the details of the control request registration standby setting process 501 executed by the determination plan generation unit 104. In the control request registration standby setting process 501, a topic ID (for example, a character string of 'operation_req') of a predetermined control request is set in a subscribe registration message 700, a wildcard (a symbol indicating that all subtopics are met) is set in a subtopic ID, and the subscribe registration message 700 is transferred to the control communication relay unit 101 (601).

FIG. 7 shows a data structure of the subscribe registration message 700.

When operating based on a publisher-subscriber architecture and receiving the subscribe registration message 700, the control communication relay unit 101 register a communication address 701 indicating an IP address of a registrant (in this case, determination plan generation unit 104) in a subscriber list 800 managed in the control communication relay unit 101 (602) with reference to a received topic ID 702 and a received subtopic ID 703.

Figures 8, 9:
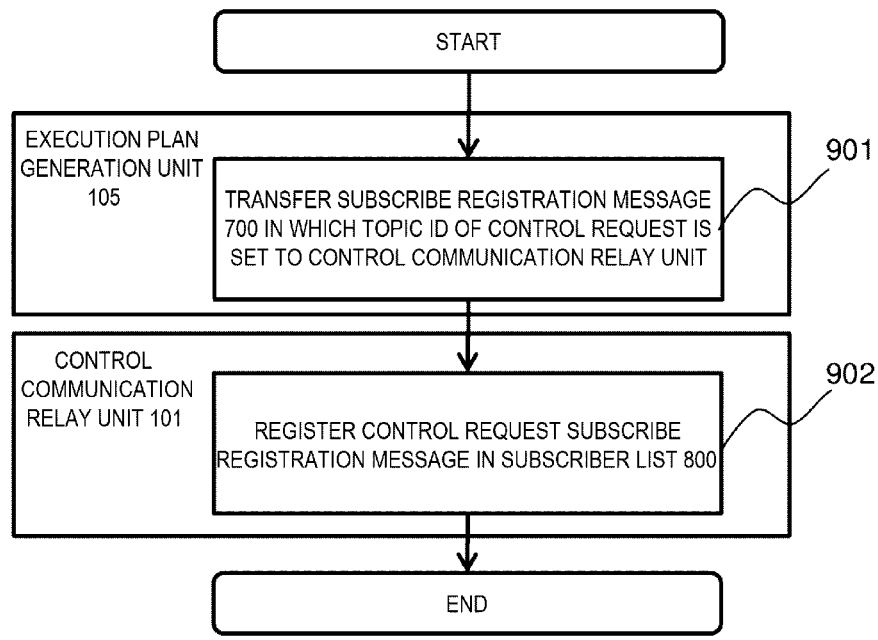
FIG. 8 is a diagram showing a data structure of a subscriber list 800.
FIG. 9 is a diagram showing a flow of a control request registration standby process 502 of an execution planning unit 105.

FIG. 8 shows a structure of the subscriber list 800.

The subscriber list 800 registers and manages a destination address list 804 that is a set of destination addresses associated with a topic ID 802 and a subtopic ID 803. When the control communication relay unit 101 receives distributed message in which the topic ID is set, the control communication relay unit 101 selects, from the subscriber list 800, an address in which the topic ID 802 matches the subtopic ID 803 and an address in which the topic ID 802 matches and the wildcard is specified in the subtopic ID 803, and transfers the distributed message to devices listed in the destination address list 804 corresponding to the matched IDs. In the control request registration standby setting process 501, since the wildcard is specified in the subtopic ID, the determination plan generation unit 104 can receive all the distributed messages to which the topic ID of the predetermined control request is added.

Similarly, the execution plan generation unit 105 also sets the topic ID of the same control request and the subtopic ID of the wildcard in the subscribe registration message 700 and transfers the subscribe registration message 700 to the control communication relay unit 101 (901) as the control request registration standby setting process 502 (see FIG. 9). Similarly, the control communication relay unit 101 registers the control request subscribe registration message 700 in the subscriber list 800 (902). Accordingly, the execution plan generation unit 105 can also receive the distributed message to which the topic ID of the control request is added.

Returning to FIG. 5, the description will be continued. After the control request registration standby setting processes 501 and 502, when the user wants to change the control content, the control request issuing unit 103 is operated to perform a control request issuing process 503.

Figure 10:
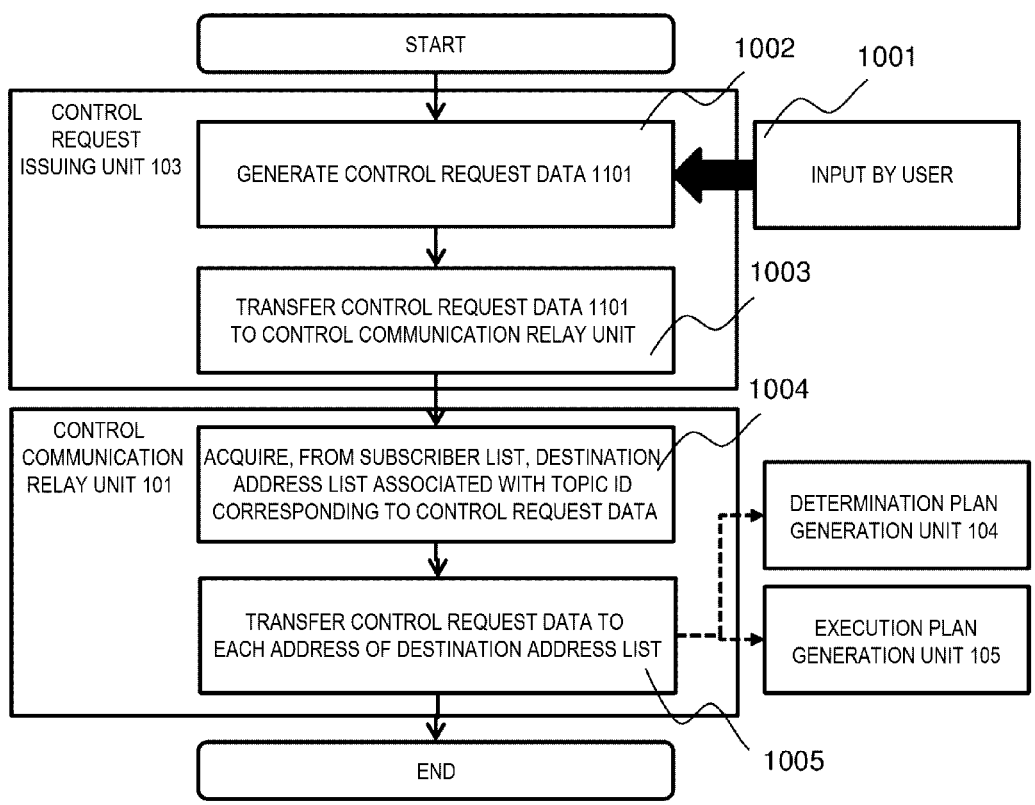
FIG. 10 is a diagram showing a control request issuing process 503.

FIG. 10 shows details of the control request issuing process 503. When receiving an input 1001 caused by the user, the control request issuing unit 103 generates control request data 1101 according to the input.

Herein, as shown in FIG. 11, a structure of the control request data 1101 will be described. The control request data 1101 includes topic information 1102, a condition description 1103 that describes a condition related to a position where the control is changed, and a result description 1104 that indicates what kind of status should be controlled.

The topic information 1102 includes a topic ID 1105 ('operation_req') indicating that it is the above-mentioned control request and a subtopic ID 1106 that is a request ID capable of uniquely identifying the control request data. Herein, it is necessary to maintain uniqueness such that the request ID is issued sequentially every time the control request issuing process 503 is executed.

The condition description 1103 includes a determination condition 1107 and a data selection condition 1108 as conditions for changing the control specified by the user. The determination condition 1107 describes a condition in which true/false determination related to a position of a range specified by the data selection condition 1108 can be executed, and when it is true, control of the present request is executed. The determination condition 1107 can also describe a condition related to spatial information such as "the number of people in a room is two or more", and in this case, the layout DB 106 can be used.

FIGS. 12A and 12B shows an example of a structure of area information data 1201 of the layout DB 106.

The area information data 1201 shown in (A) includes an area ID 1202 that uniquely identifies an area, an area type 1203 that indicates a type of the area, and an area shape 1204 in which a polygon indicating a shape of the area in a coordinate point sequence is stored. These pieces of data are used to describe the condition.

When it is assumed that data of the position is stored in a relational database system (RDBMS), information of the condition description 1103 corresponds to information that can construct an SQL statement, a return value of a select statement corresponds to the determination condition 1107, and a from clause and a where clause correspond to the data selection condition 1108.

For example, when assuming an SQL statement of "select count(distinct pedestrian.id>2 from pedestrians, area where is inside (pedestrian. location, area. shape and area.id=2", "count(distinct pedestrian.id>2" is the determination condition 1107 that indicates "two or more types of pedestrian.id", that is, "two or more people", "from pedestrians, area where is inside (pedestrian. location, area. Shape) and area.id=2" corresponds to the data selection condition 1108 that "using a table pedestrians in which position information is stored and the area in which area information data is stored, the position of the person (pedestrian. location) is inside an area. shape in which an area.id indicating the area ID is 2", that is, "person in the area having the area ID 2". In this example, when the number of persons in the area of the area ID2 exceeds two, the control is changed as in the result description 1104.

The result description 1104 includes a target area 1109, a state change type 1110, and a state change content 1111 as information indicating how the control should be changed. The target area 1109 stores the area ID 1202 of the area information data 1201, and the control for the area is executed. The state change type 1110 describes types of a state change or an interrupt. When the state change is specified in the state change type 1110, the control is executed so as to maintain a state described in the state change content 1111. When the interrupt is specified, the control is executed such that an original state is maintained after the state described in the state change content 1111 is set. For example, regarding the lighting, when the state change is specified in the state change type 1110 and the state change content 1111 is set to "illuminance is 50% of the maximum", the control is executed such that the illuminance in the area ID is about 50% of the maximum. On the other hand, when there is no lighting, and when the interrupt is specified in the state change type 1110 and the state change content 1111 is set to "illuminance is 50% of the maximum", a process of turning off the lighting again is executed after turning on the lighting such that the illuminance in the area ID is about 50% of the maximum once.

Herein, the description will be returned to FIG. 10. The control request data 1101 generated by the control request issuing unit 103 is once transferred to the control communication relay unit 101 (1003). The control communication relay unit 1101 acquires the addresses registered in the subscriber list 800, that is, the addresses of the determination plan generation unit 104 and the execution plan generation unit 105 (1004) with reference to the topic ID 1105 and the subtopic ID 1106 of the control request data 1101, and transmits the control request data to the respective addresses (1005). Accordingly, the determination plan generation unit 104 and the execution plan generation unit 105 can receive the control request.

Figure 13:
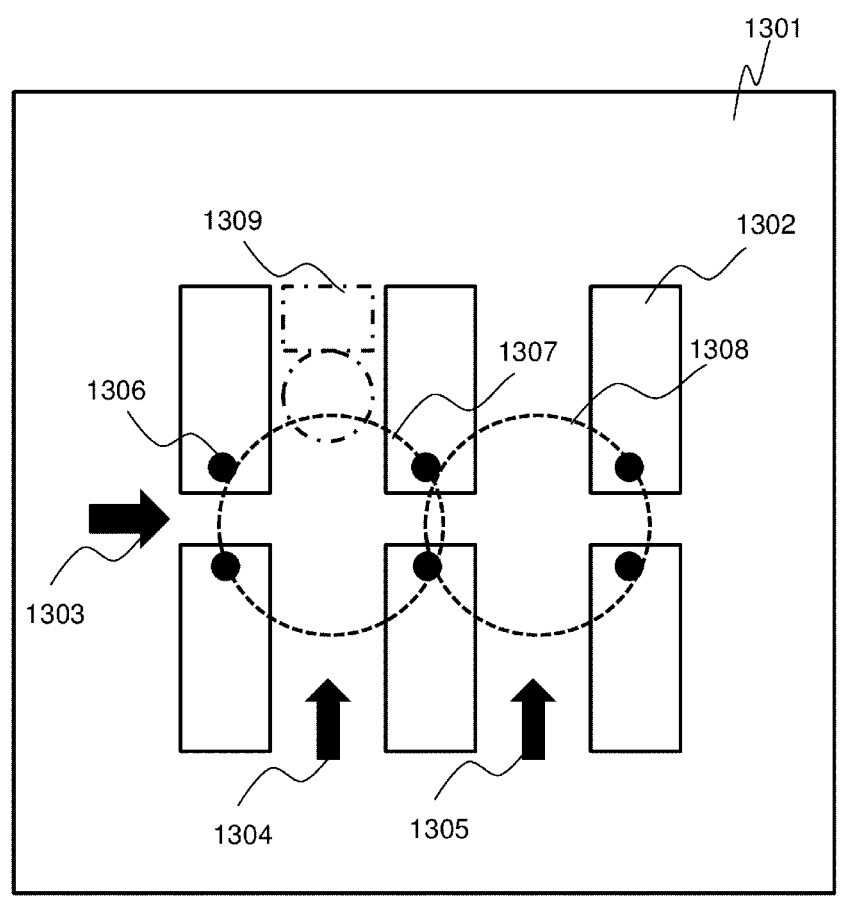
FIG. 13 is a diagram conceptually showing an example of the control request issuing process 503.

Herein, an example of the control request issuing process 503 will be described with reference to FIG. 13.

In the shown example, a target area is represented by an illustrated rectangle 1301, and several shelves 1302 are disposed in the target area. The shelves mean shelves in a warehouse, and in the warehouse, a truck moves through a passage between the shelves. Paths of the movement are between the shelves, and there are a left-to-right direction 1303 and bottom-to-top directions 1304 and 1305 in the drawing. Since a collision accident is likely to occur in an intersecting area of the paths, it is considered to turn on warning lamps (an example of the lighting device) that are provided at positions indicated by black circles 1306 and warns of the collision.

At this time, when the person enters areas 1307 and 1308 of two intersections, the warning lamps in these areas 1307 and 1308 are controlled to be turned on. Therefore, information of the areas 1307 and 1308 is stored in the area information data 1201, and the control request issuing unit 103 issues the control request data 1101 in which the condition description 1103 describes that "does the number of person in the area 1307 increase?", and the result description 1104 describes that "the warning lamps are turned on in the area 1307 by the interrupt".

However, in an actual operation of a facility, it is fully assumed that a special work occupying an area 1309 in the passage will be executed only on a certain day. At this time, when it is operated under the same conditions as described above, it is assumed that a person engaged in the special work comes into contact with the area 1307 of the intersection many times and the warning lamps is turned on many times. At this time, the path 1304 that travels on the left passage from the bottom is blocked and the truck rarely passes, but the path 1305 of the right passage is accessible. In this case, it is considered desirable to control the warning lamp by leaving only the condition of the area 1308 without setting the condition related to the area 1307. Alternatively, it is also conceivable that a shape of the area is changed or a warning lamp is operated according to another rule for the special work. In the present embodiment, one of the characteristics is that the user can freely add the control rule on site even in such a case, and the user can freely perform the device control according to a complicated rule by sequentially inputting only the request without knowing specifications of the sensor and the device.

For this process, device arrangement data 1205 of the layout DB 106 shown in FIG. 12B is used. The device arrangement data 1205 includes a device ID 1206, a device position 1207, a device influence range 1208, a device type 1209, a device model number 1210, and a device address 1211. In order to control the illuminance within the above-mentioned area ID to be about 50% of the maximum, a device that comes into contact with the area shape 1204 corresponding to the area ID is selected and becomes the control target with reference to the device position 1207 or the device influence range 1208.

Returning to FIG. 5, the description will be continued. When the control request data 1101 issued by the control request issuing unit 103 is transferred to the execution plan generation unit 105 and the determination plan generation unit 104, the determination plan generation unit 104 performs a determination plan generation process 504 and a determination plan process 506, the execution plan generation unit 105 performs an execution plan generation process 505 and an execution plan process 507.

Figure 14:
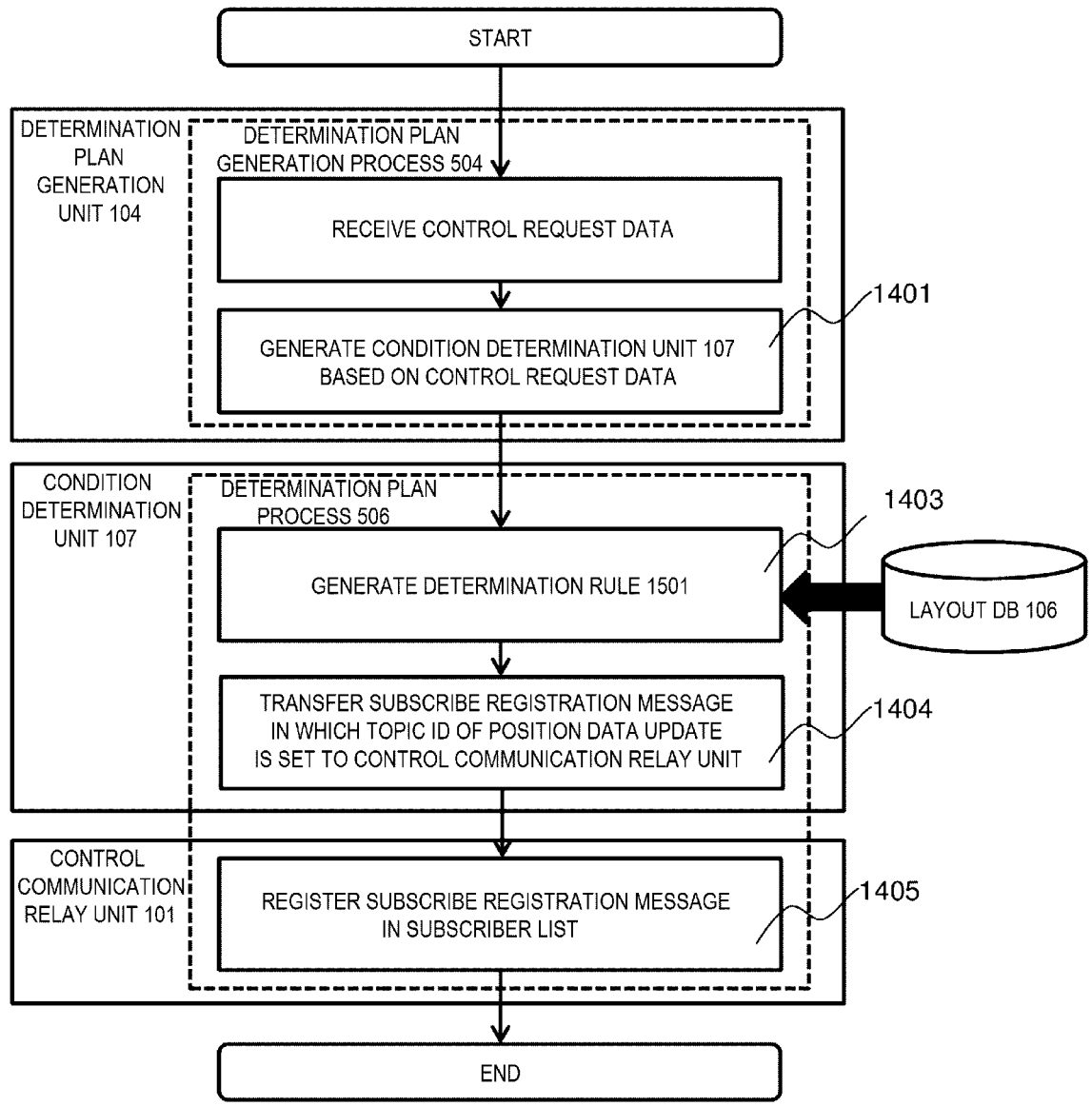
FIG. 14 is a diagram showing a flow of a determination plan generation process 504 and a determination plan process 506.

Herein, the determination plan generation process 504 and the determination plan process 506 will be described with reference to FIG. 14. The determination plan generation unit 104 that receives the control request data 1101 generates the condition determination unit 107 (1401) and passes the control request data 1101. The condition determination unit 107 is implemented so as to operate as an independent thread or process, and generates a determination rule 1501 that is a routine for determining whether a condition is satisfied based on the condition description 1103 of the received control request data 1101. FIG. 15 shows a data structure of the determination rule 1501. In principle, the determination rule 1501 converts the condition description 1103 into a form that is easy to perform, for example, a form of the above-mentioned SQL statement, and holds it in association with a request ID 1502. At this time, when layout information is necessary for interpretation of the condition description 1103, the layout DB 106 can be referenced. When the determination rule 1501 is ready, the condition determination unit 104 generates the subscribe registration message 700 in which a predetermined topic ID (for example, 'pedestrian_ location') related to updating of position data (1604), transfers the subscribe registration message 700 to the control communication relay unit 101, and registers the subscribe registration message 700 in the subscriber list (1605). Thereafter, every time a person is detected, a message notifying a fact that a person is detected is distributed to the control execution unit 109.

Figure 16:
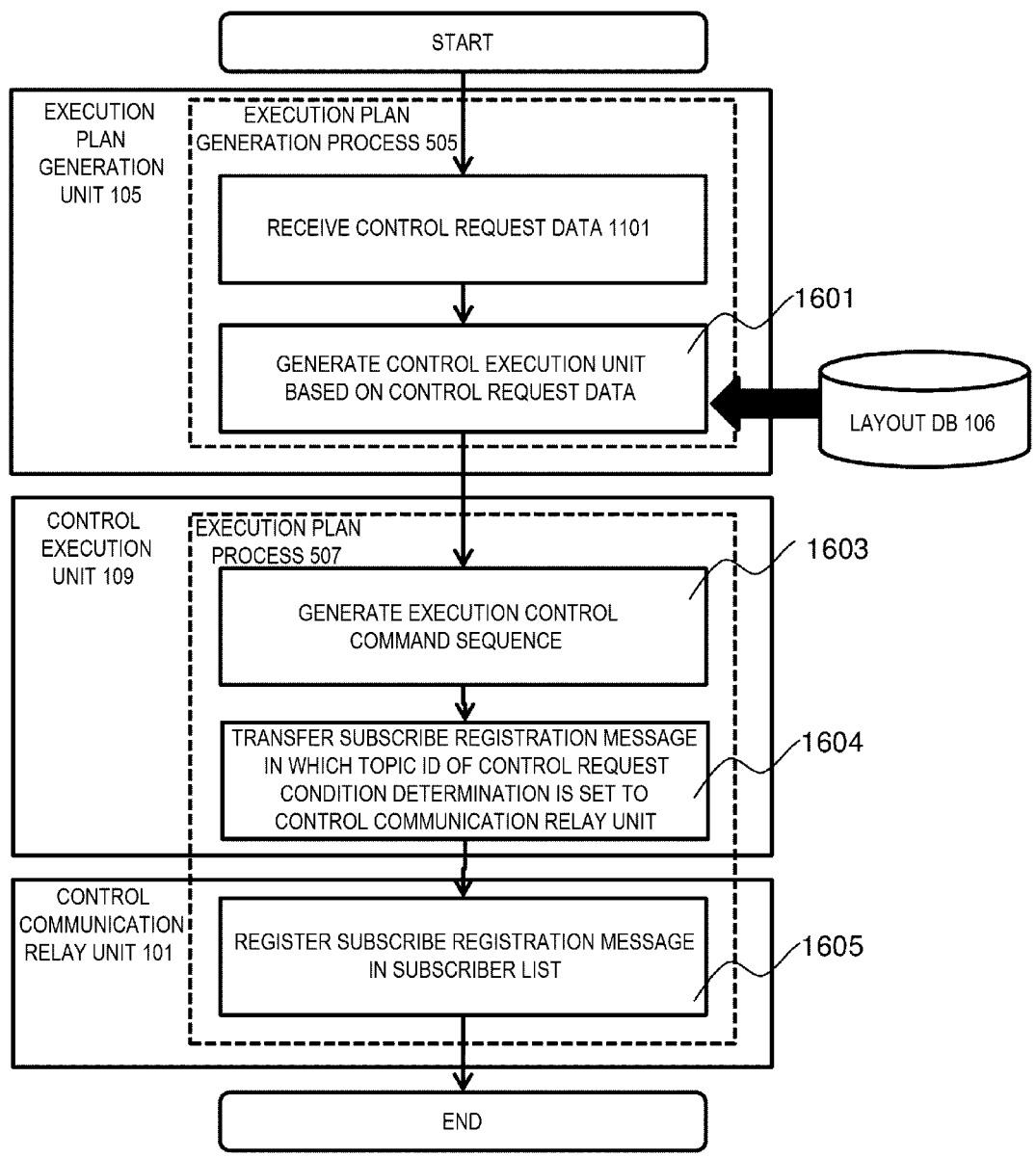
FIG. 16 is a diagram showing an execution plan generation process 505 and an execution plan process 507.

FIG. 16 shows procedures of the execution plan generation process 505 and the execution plan process 507 of the execution plan generation unit 105. The execution plan generation unit 105 that receives the control request data 1101 generates the control execution unit 109 (1601) and passes the control request data 1101. The control execution unit 109 operates independently in a similar manner as the condition determination unit 107, determines a specific content of the control based on the result description 1104 of the control request data 1101 and converts the content into an execution control command 1701 unique to each device.

Figures 17, 18:
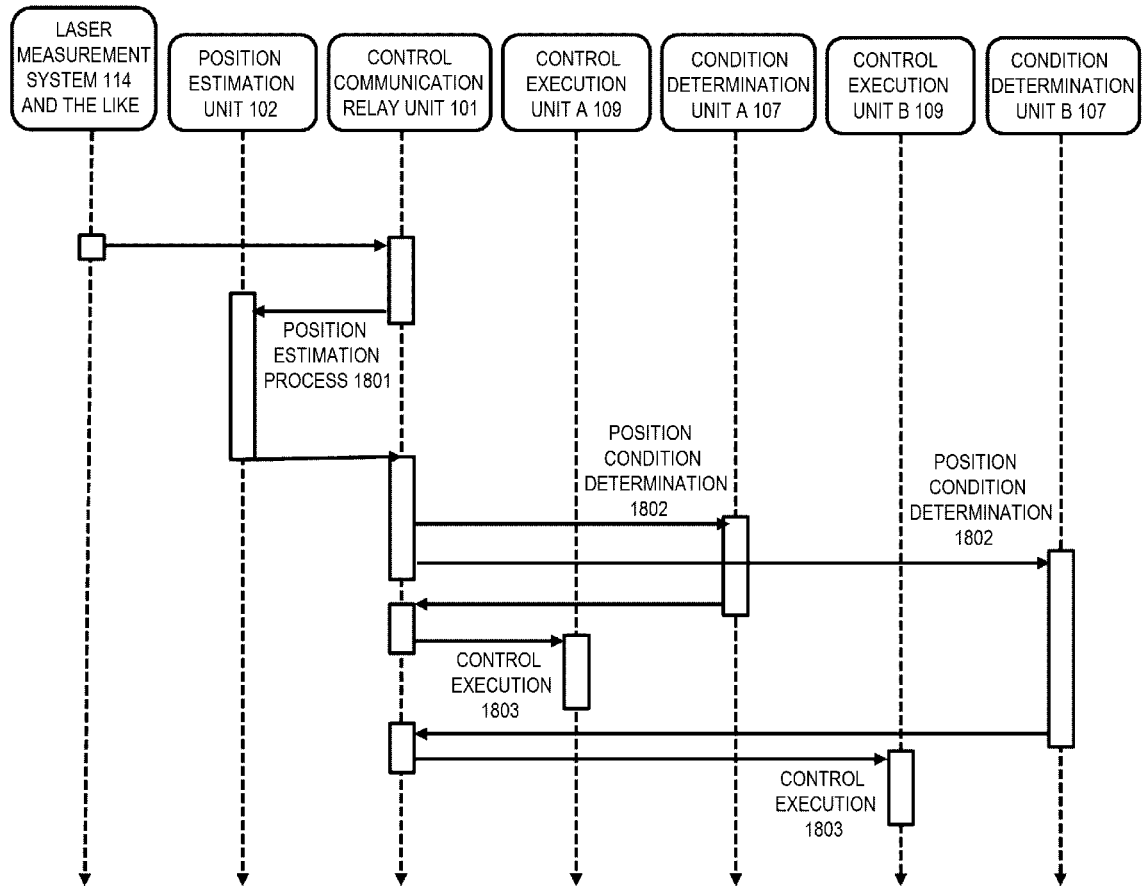
FIG. 17 is a diagram showing a data structure of an execution control command 1701.
FIG. 18 is a diagram showing a sequence of the device control.

FIG. 17 shows a data structure of the execution control command 1701. The execution control command 1701 holds a control command sequence 1702 corresponding to the control to be executed in association with a transmission target 1703. At this time, a device that is a control target is identified by collating the device position 1207 and the device influence range 1208 in the device arrangement data 1205 of the layout DB 106 and the area shape 1204 of the area information data 1201, a type and a model number of the device are identified, and the control command sequence 1702 and the transmission target 1703 matching the device are generated. A plurality of groups of the control command sequence 1702 and the transmission target 1703 are included, and the control execution unit 109 is responsible for controlling a plurality of devices. It should be noted that one control execution unit 109 may be responsible for one device, but process load increases. Since the control execution unit 109 has a simple mechanism, there is an advantage that defects and the like associated with the implementation can be reduced.

When the execution control command 1701 is ready, the control execution unit 109 generates the subscribe registration message 700 in which a predetermined topic ID (for example, 'result_ location') meaning a result of the condition determination of the control request is specified in the topic ID 702 and the request ID 1701 is specified in the subtopic ID 703 (1604), transfers the subscribe registration message 700 to the control communication relay unit 101, and registers the subscribe registration message 700 in the subscriber list (1605). Thereafter, when the determination of the condition determination unit 107 is true, when a corresponding message is issued, the message is distributed to the control execution unit 109.

Next, the details of the device control shown in FIG. 4 will be described with reference to FIGS. 18 to 24.

FIG. 18 shows a sequence of the device control. The device control starts from transmitting information of a person periodically detected by the sensor system such as the laser measurement system 114. The detection information of the person is transferred to the position estimation unit 102 via the control communication relay unit 101, and a position estimation process 1801 is executed based on the detection information.

Figure 19:
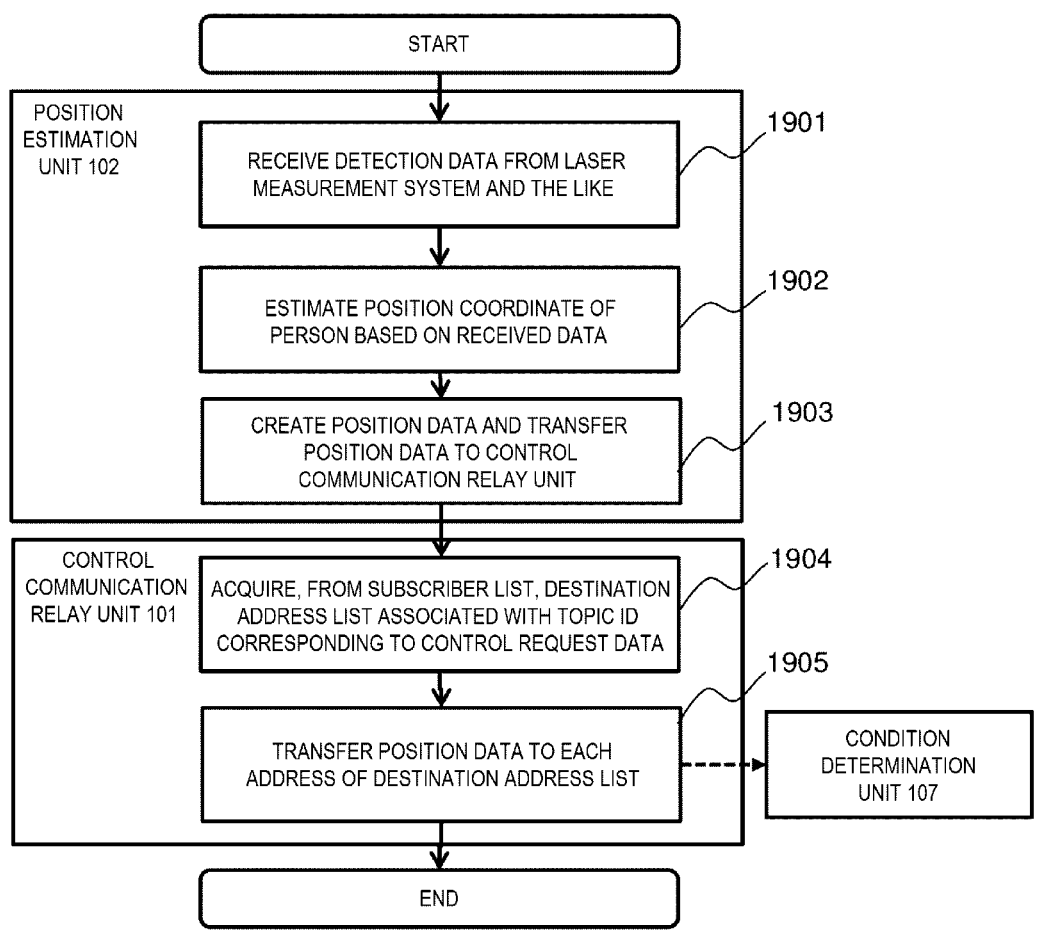
FIG. 19 is a diagram showing a flow of a position estimation process 1801.

FIG. 19 shows a flow of the position estimation process 1801.

When the position estimation unit 102 receives detection data of the person from the laser measurement system 114, the camera system 113, or the terminal positioning system 112 (hereinafter, the laser measurement system 114 will be representatively shown) (1901), the position estimation unit 102 combines the detection data to estimate a position coordinate of the person (1902).

Herein, when there are pieces of data from a plurality of the sensor systems, these pieces of detection data are processed in an integrated manner. For example, when one person is detected independently by the laser measurement system 114 and the camera system 113, the same person may be counted twice to make an incorrect condition determination. Therefore, even when the detection data related to one person is obtained separately by the plurality of the sensor systems, it is required to identify the person as a single person. As an identification method, it is possible to uniquely identify the same person by using a known method of generating a large number of hypotheses related to the position of the person and using a hypothesis that is most consistent with the received data as an estimation result.

Next, the position estimation unit 102 creates position data 2001 based on the estimation result and transfers the position data to the control communication relay unit 101 (1903).

FIG. 20 shows a data structure of the position data 2001 of the person. The position data 2001 is data including a list of the current position of the person with respect to a topic ID 2002 that means updating the position, which is the same as that set in the determination plan process 505. For each person, a person ID 2003, a measurement time 2004, and a coordinate 2005 are associated with each other to form a group, and the group has a structure in which the groups are arranged for the number of persons. This position data is information created in the process (1902) of identifying the position of the person by integrating the data of the sensor system, and is added as it is or after being converted to an appropriate coordinate or a sampling rate.

When receiving the position data 2001, the control communication relay unit 101 acquires, from the subscriber list, the destination address list 804 associated with the topic ID corresponding to the control request data (1904). The destination address list 804 stores the address of the condition determination unit 107 generated in the control condition setting, and the position data 2001 is transferred to each address in the destination address list (1905).

Returning to FIG. 18, the description will be continued. As described above, when the position estimation process 1801 ends, the position data 2001 is distributed to all the condition determination units 107 generated in the control condition setting (in this example, there are two condition determination units A and B). These condition determination units 107 individually perform a position condition determination 1802.

Figure 21:
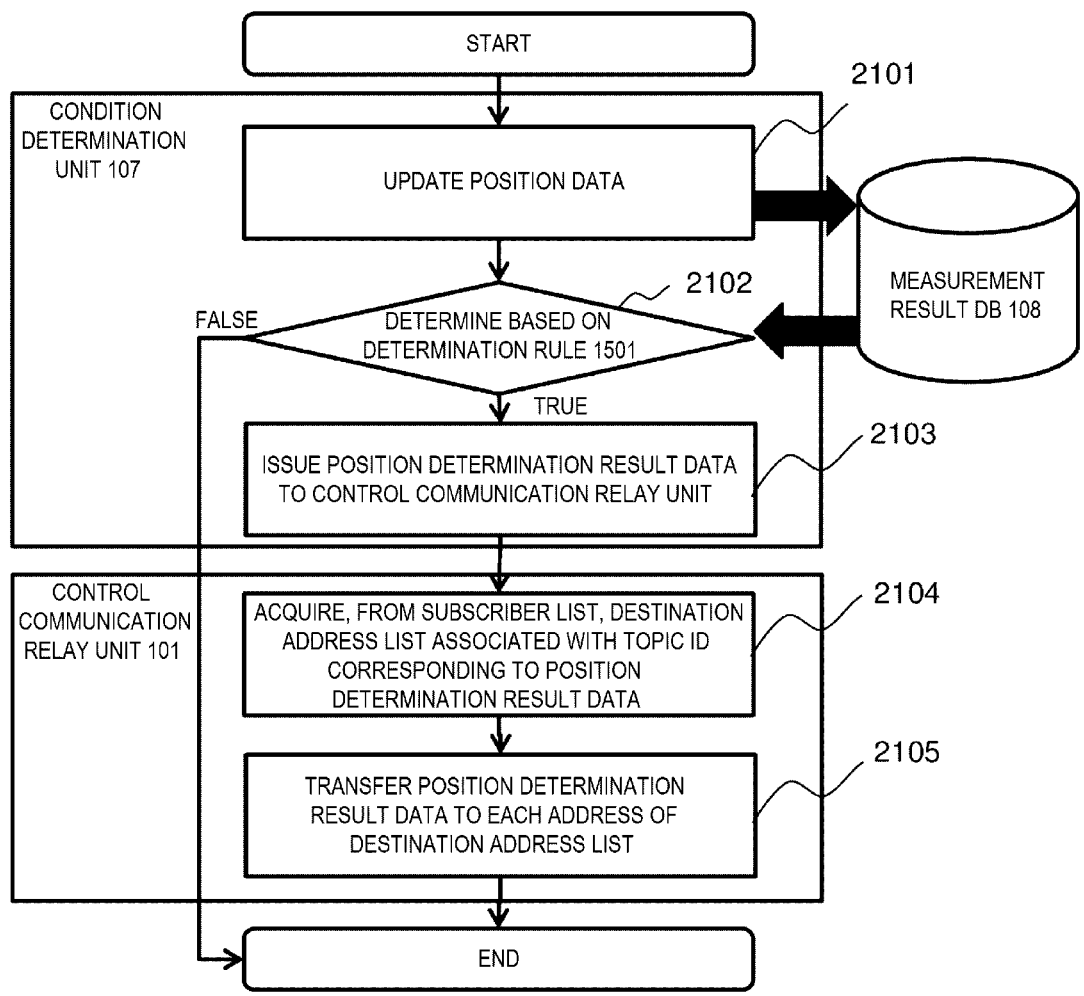
FIG. 21 is a diagram showing a flow of position condition determination 1802.

FIG. 21 shows a flow of the position condition determination 1802. In the position condition determination 1802, past position data 2200 of the measurement result DB 108 is updated using the received position data 2001 (2101). The condition determination unit 107 performs determination based on the determination rule 1501 using the past position data 2200 (2102). Since the past position data 2200 also stores information of the past position data, it becomes possible to deal with a condition that depends on temporal changes, such as "alert when a residence time exceeds 10 seconds".

FIG. 22 shows a list of data items of the past position data 2200. The past position data 2200 is stored in the measurement result DB 108, and includes a person ID 2202, a measurement time 2203, and a coordinate 2204 in a format that can be identified by a request ID 2201. The position data 2001 stores the past position data 2200 received so far for each condition determination unit 107, the person ID 2202 is copied from the person ID 2003, the measurement time 2203 is copied from the measurement time 2004, and the coordinate 2204 is copied from the coordinate 2005.

When the past position data 2200 is updated (2101), it is possible to store only data that contributes to a determination condition 1503, that is, data that satisfies the condition of a data selection condition 1504, among the plurality of pieces of data of the person stored in the position data 2001. Accordingly, the number of data can be reduced and high-speed determination can be performed. Further, it is possible to prevent the past position data 2200 from becoming too large and prevent the determination from being delayed by appropriately deleting the past data (which can be determined by the measurement time 2203) such that the data does not appear in the data selection condition 1504.

Further, in view of the operation of the plurality of the condition determination units 107, substances of the measurement result DB 108 can be separately stored in a plurality of storage devices such as an HDD, so that a decrease in speed due to simultaneous reading and writing can be prevented.

The determination based on the determination rule 1501 in the condition determination unit 107 is performed (2102), and when a result thereof is false, the position condition determination 1802 ends. On the other hand, when the determination result is true, position determination result data 2301 is issued to the control communication relay unit 101 (2103).

Herein, FIG. 23 shows the position determination result data 2301. The position determination result data 2301 includes a topic ID 2302, a subtopic ID 2303, and a determination result 2304. For the topic ID 2302, the predetermined value (for example, 'result_location') indicating the position determination result data, which is the same as that designated in the execution plan process 507, is stored. Further, the determination result 2304 also stores predetermined data (for example, a character string "True") indicating that a result thereof is true. For the subtopic ID 2303, the request ID 1502 of the determination rule 1501 is stored. This is a value of the subtopic ID 1106 of the control request data received when the condition determination unit 107 is generated, that is, received in the determination plan process 505, and indicates which control request data the position determination result data 2301 corresponds to.

Figure 24:
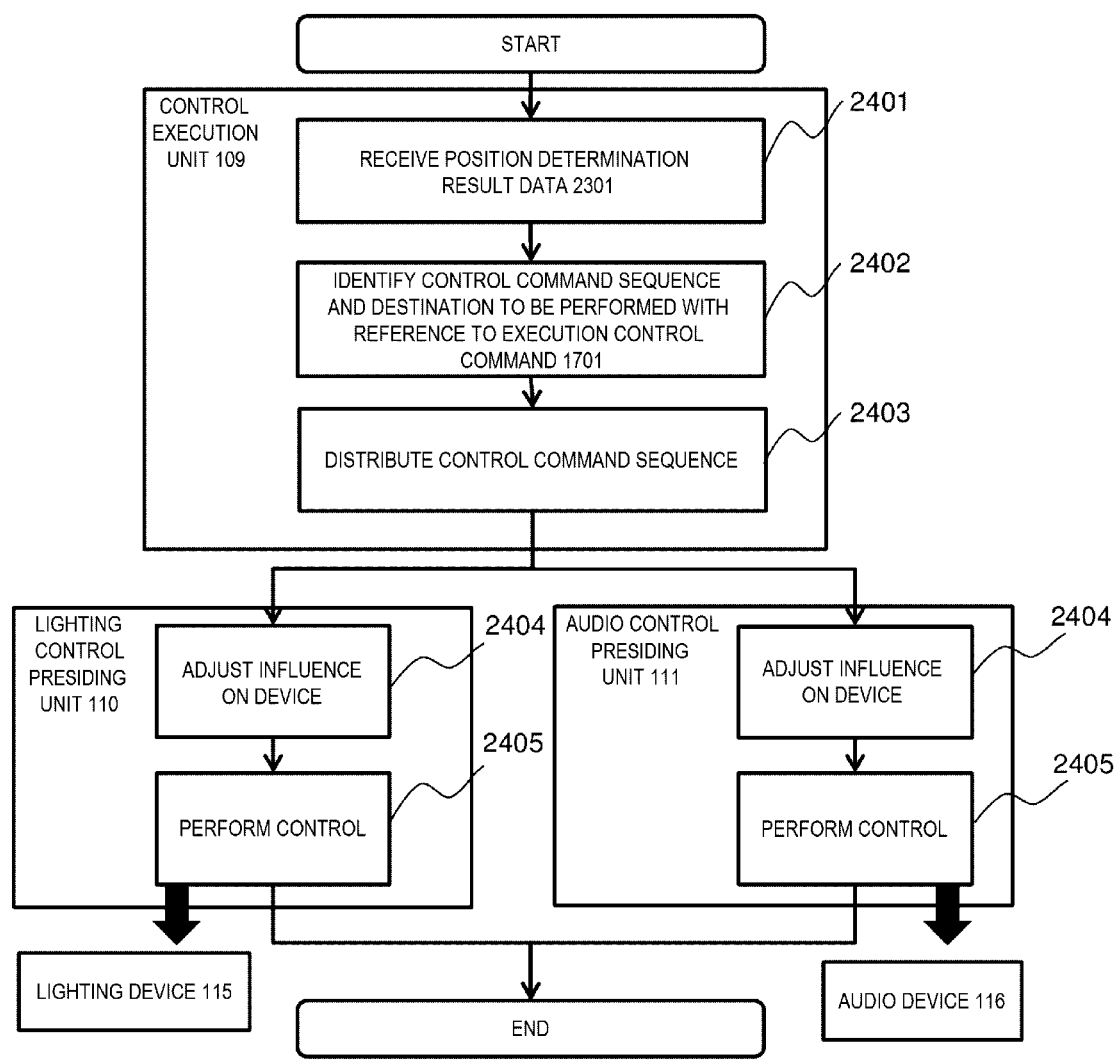
FIG. 24 is a diagram showing a flow of control execution 1803.

FIG. 24 shows a process flow of control execution 1803.

When the control execution unit 109 receives the position determination result data 2301 (2401), the control execution unit 109 identifies the control command sequence 1702 and the transmission target 1703 to be executed with reference to the execution control command 1701 (2402). Thereafter, the control command sequence 1702 is distributed to the lighting control presiding unit 110 and the audio control presiding unit 111 (2403). The lighting control presiding unit 110 and the audio control presiding unit 111 examine a content of the received control command, and evaluate and adjust an influence on the device (2404). For example, it is possible that a plurality of the control execution units 109 sequentially request turning-on and turning-off of the lighting. In this case, blinking the lighting excessively causes a failure. Therefore, an adjustment process 2404 is provided to verify a problem that may occur when the plurality of the control execution units 109 issue different control requests. For example, the occurrence of the failure is verified by adding an adjustment such as reducing a blinking frequency of the lighting. Finally, the control is executed by issuing the adjusted control command to the lighting device 115 and the audio device 116 (2405).

As described above, even when the system is in operation, the device control can be set appropriately and freely using the position information of the person.

Figure 25:
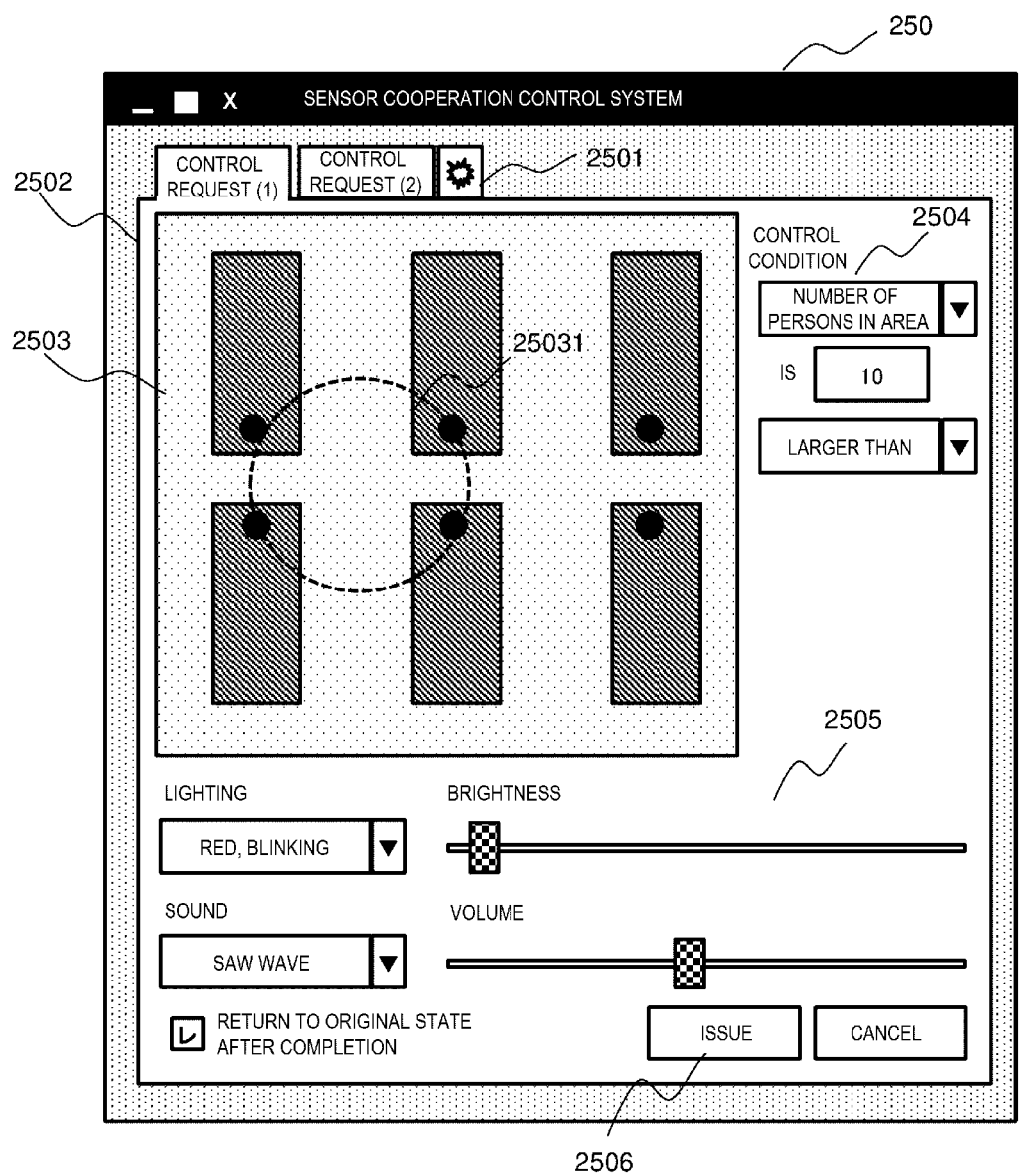
FIG. 25 is a diagram showing a screen display for issuing a control request.

FIG. 25 shows an example of a display screen for the control request issuing unit 103 to issue the control request. A display screen 250 is a screen for sensor cooperation control, is generated by the control request issuing unit 103, and is displayed on the monitor 209. By performing an input operation on the display screen 250, the control request issuing process 503 can be executed.

The display screen 250 includes a tab 2501, and by operating this tab 2501, new control requests can be sequentially issued. In the shown example, screens 2502 of two control requests are displayed. The screen 2502 includes a preset layout diagram 2503 of the stationary object such as a device, an area 25031 serving as the control condition in the diagram, and an item for inputting a control condition 2504. The area 25031 is added to the area information data 1201 of the layout DB 106, and is used as the determination condition 1107 and the data selection condition 1108 of the control request data 1101 along with other inputs. Further, there is an item for inputting a control content 2505. The content 2505 is used as the result description 1104. When an issue button 2506 is operated after all the items is input, the control request issuing process 503 is executed, and a rule is reflected in the control and becomes the control rule.

In this way, according to the first embodiment, since the control rule based on the condition related to the position of the person can be freely set, the device control can be changed according to the status of the person on the site.

Second Embodiment

Figure 26:
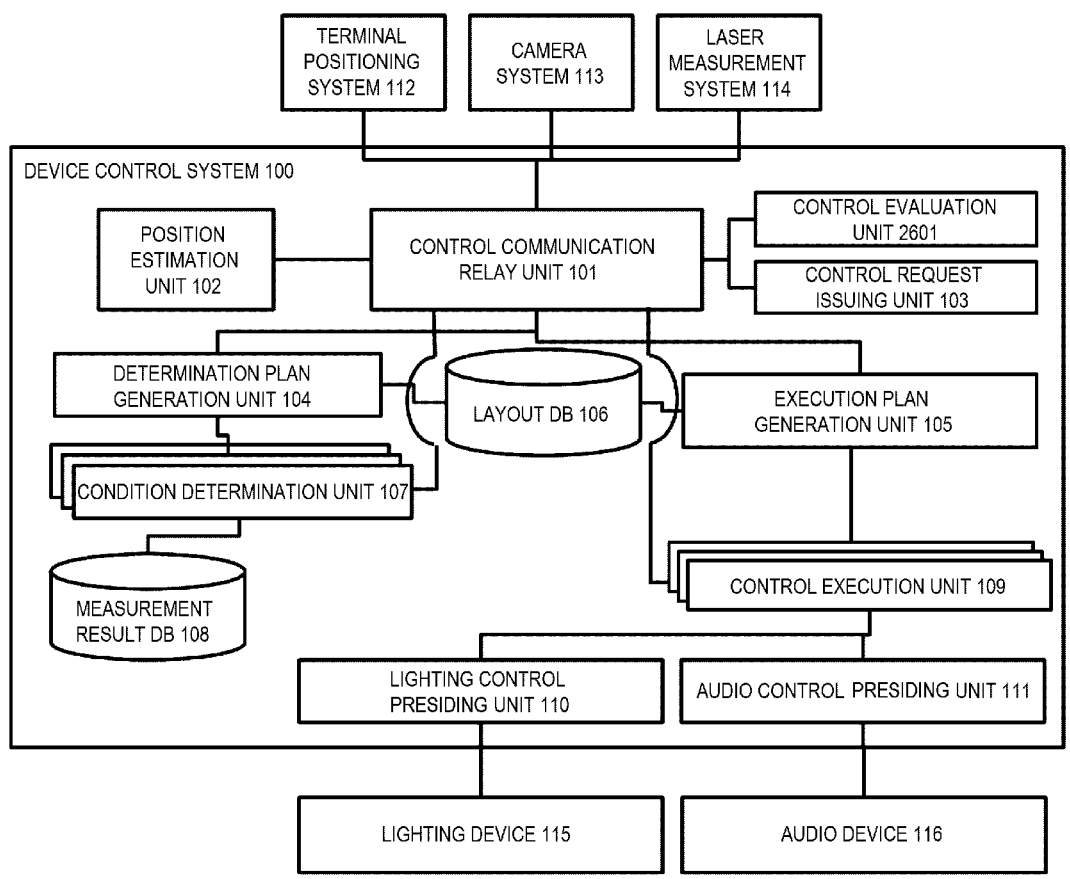
FIG. 26 is a diagram showing a configuration of a device control system according to a second embodiment.

FIG. 26 shows a configuration of the device control system 100 according to a second embodiment.

The second embodiment is different from the device control system 100 according to the first embodiment in that a control evaluation unit 2601 for obtaining a validity evaluation of a control parameter (that is, control condition 2504 and control content 2505) from the user is added. Further, the determination plan generation unit 104 and the execution plan generation unit 105 have a function of receiving the input of the control evaluation unit 2601 and automatically adjusting parameters of the condition determination unit 107 and the control execution unit 109, and the control execution unit 109 also has a function of optimizing device allocation among the control requests.

In the site, the control parameter may be changed during the system operation. In the first embodiment, the control request can be added in the control request issuing unit 103. Therefore, after the system is restarted once, all the control requests can be issued in a form including a new control request. However, since it is necessary to observe the actual operation for a fine adjustment of the parameter, it is necessary to repeat a procedure of confirming whether the result of the change is valid and changing the parameter and restarting if the result is not appropriate. Therefore, the parameters cannot be finely adjusted very often.

In view of such a circumstance, the second embodiment implements a function capable of changing the control request and automatically adjusting the parameters without restarting the system.

Figure 27:
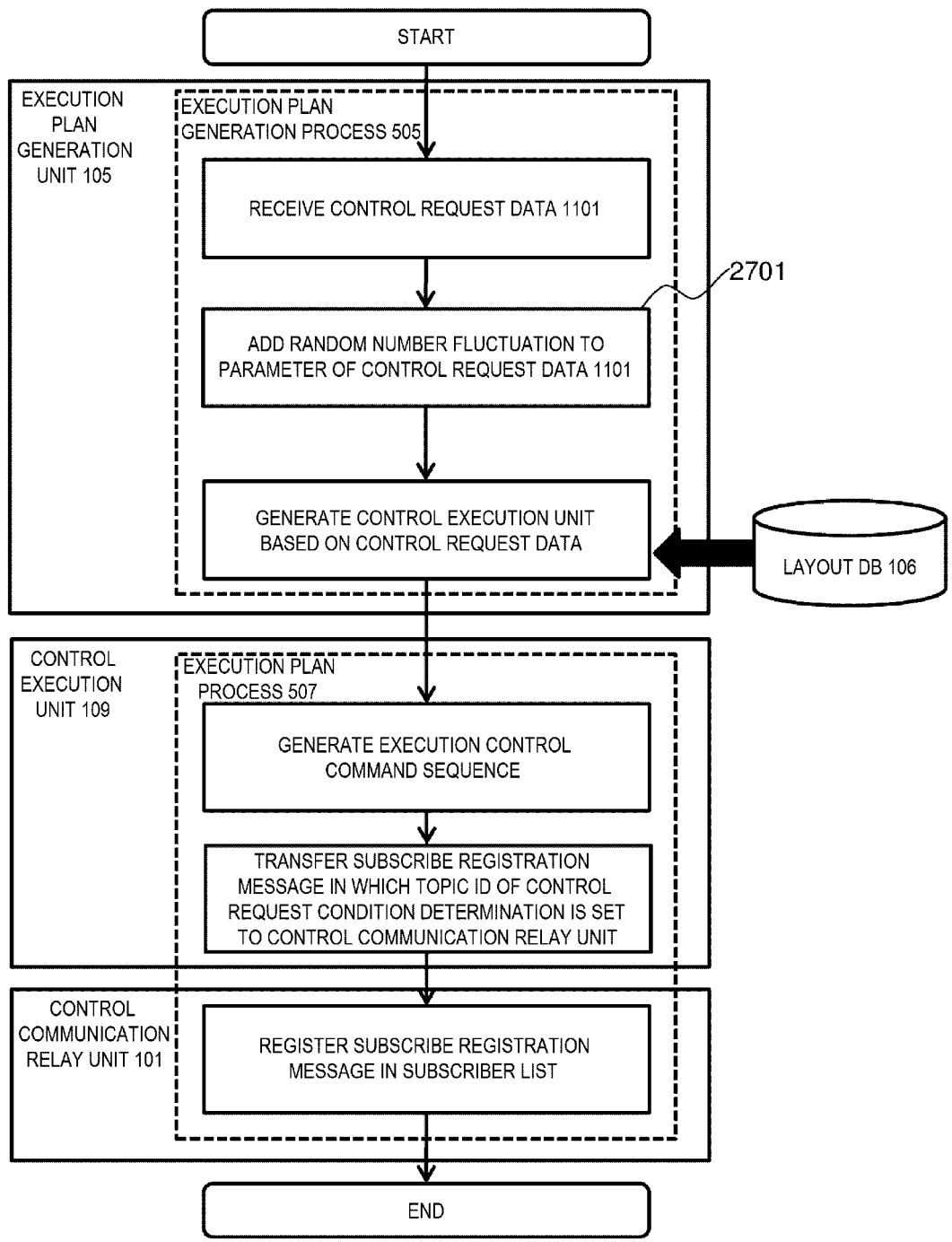
FIG. 27 is a diagram showing an example of an execution plan generation process.

FIG. 27 shows the execution plan generation process 505 of the execution plan generation unit 105 in the second embodiment. In the execution plan generation process 505, a parameter of random number fluctuation is added to the control request data 1101 (2701). Accordingly, a width of the random number is given to parameters of the state change content 1111 of the control request data 1101 of FIG. 11. Specifically, numerical values such as the number of people and the illuminance are changed to a form in which the width of the random number is written, such as "when the number of people in the area ID2 is (2 to 10) or less". Similarly, in the determination plan generation process 504 of the determination plan generation unit 104, the random number is added to parameters of the determination condition 1107. The condition determination unit 107 and the control execution unit 109 perform the determination and the control while updating the random number values at an appropriate timing such as every one minute. The width of the random number is fixed to a predetermined value in an initial state, but is changed when an input is received from the control evaluation unit 2601.

FIG. 28 shows a sequence diagram when the input is received from the control evaluation unit 2601.

The control evaluation unit 2601 receives an evaluation of whether the control is good or bad from the user, generates control evaluation data 3001 represented a result, and distributes the control evaluation data 3001 to the determination plan generation unit 104 and the execution plan generation unit 105 (2802). Although the description is omitted because it is repeated, this distribution can be implemented by transmitting a message to the control communication relay unit 101 with a proper topic ID, similar with other procedures. FIG. 29 shows an example of a data structure of control evaluation data 2901. The control evaluation data 2901 is data including an evaluation time 2902 that means a time at which the evaluation is received, and an evaluation content 2903 that means a quality thereof.

As a determination plan evaluation process 2803 and an execution plan evaluation process 2804, the determination plan generation unit 104 and the execution plan generation unit 105 distribute, to the condition determination unit 107 and the control execution unit 109, an instruction of changing a range of the random number fluctuation of the control parameter based on the control evaluation data 3001.

Figure 30:
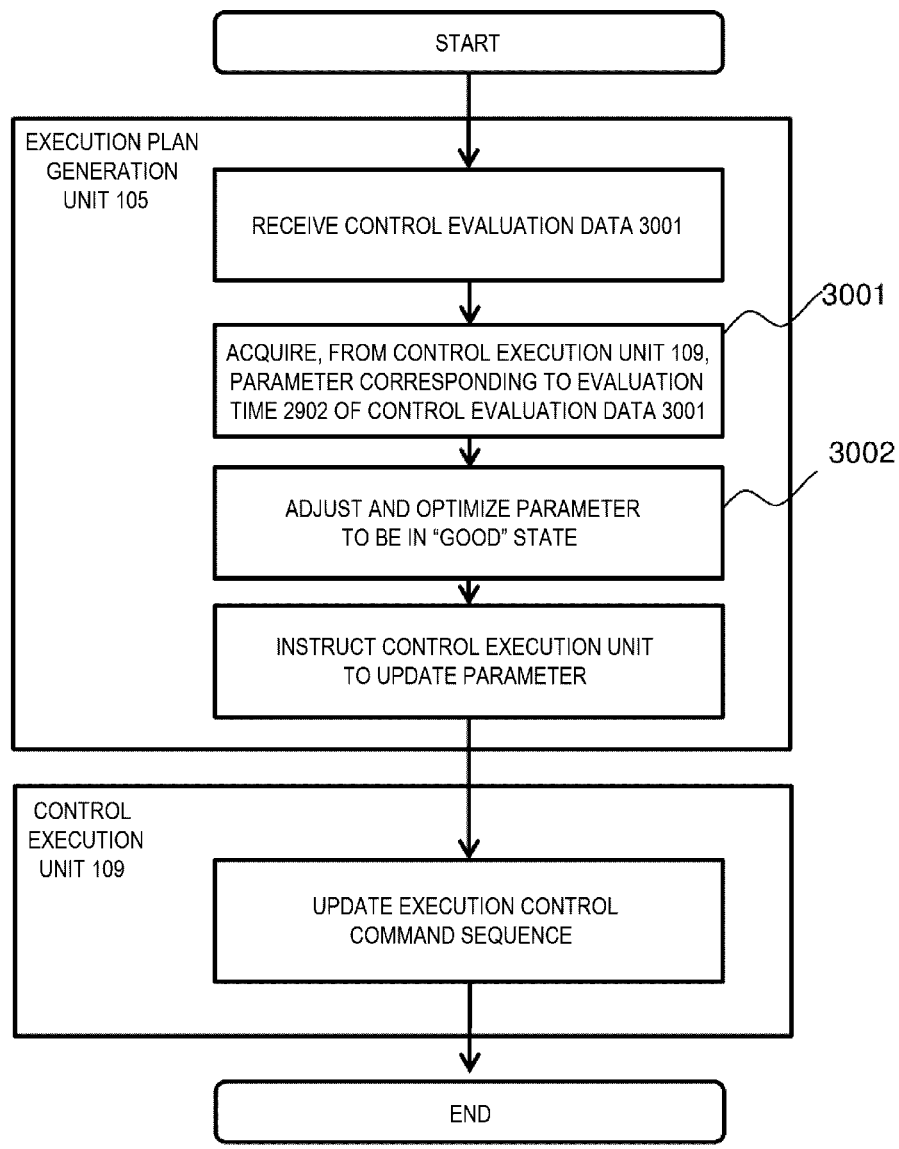
FIG. 30 is a diagram showing an example of an execution plan evaluation process.

FIG. 30 shows the execution plan evaluation process 2804. When receiving the control evaluation data 2901, the execution plan generation unit 105 identifies a value of the random number at that time with reference to the evaluation time 2902 (3001). Based on the value of the random number, the parameters are adjusted (3002). For example, when the evaluation content 2903 is "good" and the random number value at this time is larger than an average of a current setting range, the current setting range is increased slightly. Accordingly, it becomes easier to take surrounding values for which the evaluation content 2903 is "good", and a "good" status is more likely to occur. This method is an example, and any adjustment method can be used as long as the method is an adjustment method of making the "good" state occur more frequently or a "bad" state less likely to occur.

Further, at this time, when there is overlapping control among the plurality of the control execution units 109, it is possible to perform optimization such as omitting the control.

In response to a result thereof, the execution plan generation unit 105 instructs the control execution unit 109 to update the parameters. The control execution unit 109 receives an update instruction of the parameters and updates an effective control command sequence.

A similar process is also executed by the determination plan generation unit 104, and the adjustment of the determination parameter is performed. By this procedure, it is possible to approach a "good" parameter.

In the second embodiment, a function of request deletion can also be implemented. In order to implement the function, first, when transmitting the subscribe registration message in the control request registration standby process 501 and the control request registration standby process 502, the determination plan generation unit 104 and the execution plan generation unit 105 simultaneously distribute and register a message in which a predetermined value (for example, "delete_req") that means the deletion of the control request is the topic ID and the subtopic ID is the wildcard. Then, a procedure of the request deletion is executed to cancel request registration.

Figure 31:
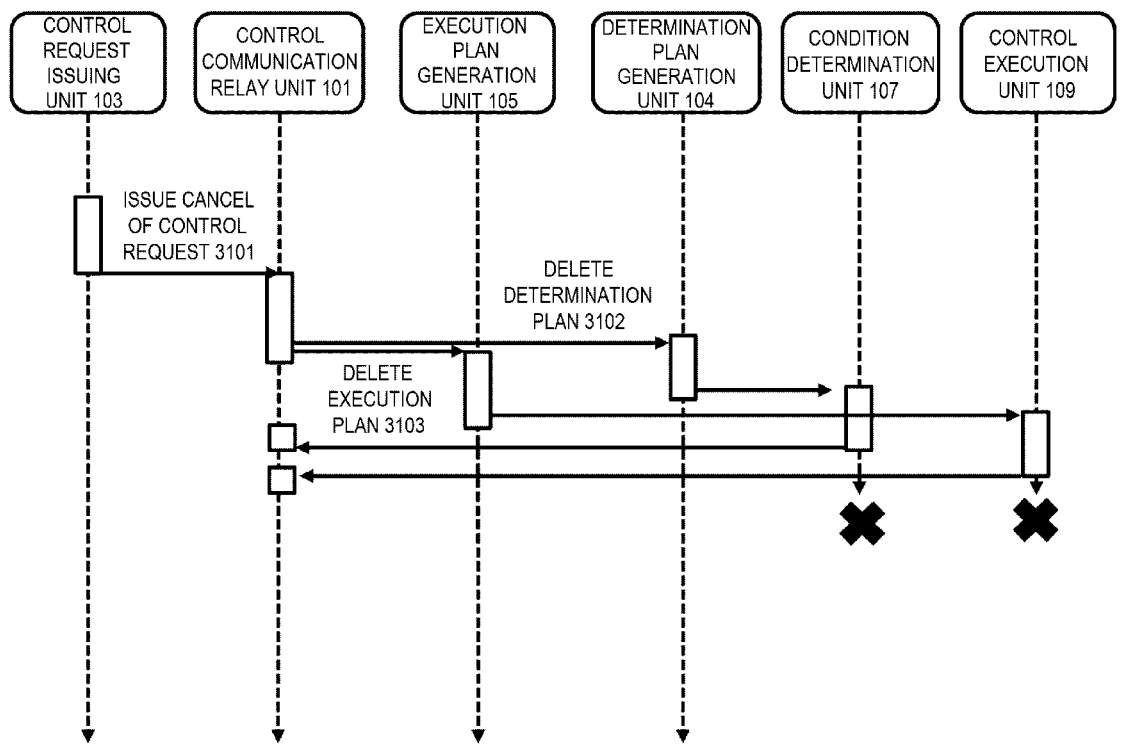
FIG. 31 is a diagram showing an example of a sequence for deleting a control condition.

FIG. 31 shows a sequence diagram of the request deletion. The procedure of the request deletion is as follows. First, when the user operates the control request issuing unit 103 to instruct the cancellation of the control request (3101), the message in which the above-mentioned predetermined value that means the deletion of the control request is the topic ID and a request ID of a cancel target is the subtopic ID 1106 is transferred to the control communication relay unit 101. Then, the message is distributed to the determination plan generation unit 104 and the execution plan generation unit 105 (3102, 3103). The determination plan generation unit 104 and the execution plan generation unit 105 delete the condition determination unit 107 and the control execution unit 109 corresponding to the subtopic ID 1106, respectively. At this time, when there is overlapping between the plurality of the condition determination units 107 and the control execution units 109, optimization such as omitting may be performed. At the same time, deletion is performed on the subscriber list 800 of the control communication relay unit 101.

As described above, in the second embodiment, since the control rule can be changed by the instruction of "good" or "bad", the parameter adjustment at the site becomes easier.

Although the embodiments have been described above, the invention is not limited to the above-described embodiments and can be variously modified and applied.

For example, the device control system according to the above-described embodiments detects presence of the person and applies the sensor information to the device control. According to an application example, the invention is not limited to the person, and is applicable to the device control system that detects the moving object and controls the device using the sensor information. For example, it is also applicable to a device control system such as a sound wave control system that detects birds and beasts using an infrared sensor or an image sensor and controls a sound wave generator using sensor information to generate a specific sound wave to get rid of the birds and beasts. Furthermore, as another example, the invention is not limited to the moving object, and is applicable to a traffic light control system that detects a position and movement of a moving body such as a vehicle using the image sensor and controls a traffic light using sensor information.

Further, in the above-described embodiments, the device control system 100 includes the device control presiding unit such as the lighting control presiding unit 110 and the audio control presiding unit 111, but these device control presiding units may be configured as separate devices and provided physically distant to the device control system 100, for example, at a location near devices 115 and 116. In this case, a server configuring the device control system 100 and the device including the device control presiding unit having a different configuration may be connected via a network. In this case, the device control system 100 can be understood as a device control information providing system or a device control information generating system that provides control information which is an output from the control execution unit 109.

REFERENCE SIGN LIST

100: device control system
101: control communication relay unit
102: position estimation unit
103: control request issuing unit
104: determination plan generation unit
105: execution plan generation unit 106: layout DB
107: condition determination unit
108: measurement result DB
109: control execution unit
110: lighting control presiding unit
111: audio control presiding unit
112: terminal positioning system
113: camera system
114: laser measurement system
115: lighting device
116: audio device

The invention claimed is:

1. A device control system that performs device control, the device control system comprising:
   a control request issuing unit configured to issue a control request that defines a position of a moving object and the device control according to an operation of a user;
   a determination plan generation unit configured to, based on the control request issued by the control request issuing unit, generate a condition determination unit configured to determine whether a condition of the control request related to the moving object is satisfied and issue an identifier of the control request;
   one or a plurality of condition determination units generated by the determination plan generation unit;
   an execution plan generation unit configured to generate a control execution unit configured to receive the identifier of the control request, identify a device that is a control target according to a control rule defined in the control request, and transfer a control command according to a control procedure for the device to the device; and
   one or a plurality of control execution units generated by the execution plan generation unit.

2. The device control system according to claim 1, wherein
   the control request issuing unit issues the control request including topic information including a predetermined code indicating that it is the control request, a condition description including a determination condition specified by the user, and a result description in which a state change of the device is described.

3. The device control system according to claim 1, further comprising:
   a control communication relay unit configured to relay the control request issued from the control request issuing unit and transfers the control request to the determination plan generation unit and the execution plan generation unit, wherein
   the control communication relay unit stores a subscriber list in which an identifier that uniquely identifies a communication topic and a destination address of the determination plan generation unit are registered.

4. The device control system according to claim 3, wherein
   when the plurality of the condition determination units are generated, only the condition determination unit that has determined that a condition for changing the device control is satisfied notifies the control execution unit via the control communication relay unit of information related to the condition determination unit.

5. The device control system according to claim 2, further comprising:
   a layout database configured to manage area information data that defines an area and device arrangement data that defines an arrangement of the device, wherein
   the execution plan generation unit, based on a description of control data specified by the control request, generates the control execution unit configured to identify the device that is the control targets with reference to the layout database and generate an execution control command specific to each device based on the description of the control data specified by the control request.

6. The device control system according to claim 1, further comprising:
   a layout database configured to manage area information data that defines an area and device arrangement data that defines an arrangement of the device; and
   a measurement result database configured to store a measurement result related to the position of the moving object acquired in the past, wherein
   the condition determination unit determines a condition corresponding to the control request related to a temporal change of the position of the moving object by performing the determination with reference to the layout database, and
   with reference to the measurement result database.

7. The device control system according to claim 1, further comprising:
   a position estimation unit configured to receive detection information related to the moving object obtained from a plurality of sensors and estimate a position coordinate of the moving object; and
   a measurement result database configured to record the position of the moving object identified by the position estimation unit, wherein
   the condition determination unit determines a condition related to the position of the moving object with reference to the measurement result database.

8. The device control system according to claim 1, further comprising:
   a control communication relay unit configured to relay the control request from the control request issuing unit and transfer the control request to the determination plan generation unit and the execution plan generation unit; and
   a first control execution unit and a second control execution unit that are generated in response to the control request, wherein
   the control communication relay unit transfers position data of the moving object to a first condition determination unit and a second condition determination unit,
   the first condition determination unit and the second condition determination unit respectively perform determinations based on a determination rule using the position data, and transfer determination results to the corresponding first control execution unit and the second control execution unit via the control communication relay unit, and
   the first control execution unit and the second control execution unit identify the control command and transmission of the control command according to the determination result.

9. The device control system according to claim 1, further comprising:
   a plurality of control presiding units configured to preside the device, wherein
   the plurality of control presiding units examine contents of a plurality of the control commands issued by the plurality of control execution units and adjust an influence on the device.

10. The device control system according to claim 2, wherein the control request issuing unit
displays, for each control request, a display screen including a diagram showing a layout of the device, an item for inputting the condition, and an item for inputting a content of the device control, and
issues the control request according to an input from the display screen.

11. The device control system according to claim 1, further comprising:
a control evaluation unit configured to receive an input of evaluation of whether an operation of the device is good or bad, wherein
the condition determination unit or the control execution unit includes
a unit that randomly changes apart or all of numerical values appearing in the control rule within a predetermined range,
a unit that identifies the numerical value that is a target of the evaluation, and
a unit that changes the range of the random change according to a content of the evaluation.

12. A device control method comprising:
a control request issuing step of issuing, by a control request issuing unit, a control request that defines a position of a moving object and device control according to an operation of a user;
a determination plan generation step of generating one or a plurality of condition determination units having an identifier of the control request based on the control request issued in the control request issuing step;
a step of determining, by one or a plurality of condition determination units generated in the determination plan generation step, whether a condition related to the moving object of the control request is satisfied;
an execution plan generation step of generating one or a plurality of control execution units configured to receive the identifier of the control request and identify the device that is a control target according to the control rule defined in the control request; and
a step of transferring, by one or the plurality of control execution unit generated in the execution plan generation step, the control command according to a control procedure for the device to the device.

13. The device control method according to claim 12, wherein
in the control request issuing step, the control request that includes topic information including a predetermined code indicating that it is the control request, a condition description including a determination condition specified by the user, and a result description in which a content of a state change of the device is described is issued.

* * * * *